(12) United States Patent
Han et al.

(10) Patent No.: US 9,569,031 B2
(45) Date of Patent: Feb. 14, 2017

(54) TOUCH SCREEN PANEL HAVING A PLURALITY OF OPENINGS IN A PLURALITY OF SENSING CELLS

(71) Applicant: Samsung Display Co., Ltd., Yongin-si, Gyeonggi-do (KR)

(72) Inventors: Kwan-Young Han, Yongin (KR); Chang-Sub Jung, Yongin (KR); Hwan-Hee Jeong, Yongin (KR); Sung-Chul Kim, Yongin (KR); Jae-Woo Choi, Yongin (KR); Tae-Ik Kim, Yongin (KR); Hyun-Sik Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 119 days.

(21) Appl. No.: 13/915,599

(22) Filed: Jun. 11, 2013

(65) Prior Publication Data
US 2013/0328830 A1 Dec. 12, 2013

(30) Foreign Application Priority Data

Jun. 12, 2012 (KR) .......... 10-2012-0062874

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01)

(58) Field of Classification Search
CPC .............. G06F 3/0418; G06F 3/044

USPC ....................................................... 345/173
See application file for complete search history.

(56) References Cited

U.S. PATENT DOCUMENTS

| | | | |
|---|---|---|---|
| 2009/0315859 A1* | 12/2009 | Chien et al. | 345/175 |
| 2010/0045613 A1* | 2/2010 | Wu | G06F 3/044 345/173 |
| 2010/0136868 A1* | 6/2010 | Chien et al. | 445/24 |
| 2010/0328268 A1* | 12/2010 | Teranishi et al. | 345/175 |
| 2011/0007030 A1 | 1/2011 | Mo et al. | |

(Continued)

FOREIGN PATENT DOCUMENTS

| | | |
|---|---|---|
| EP | 1986084 A1 | 10/2008 |
| JP | 2010-170163 | 8/2010 |

(Continued)

OTHER PUBLICATIONS

KIPO Notice of Allowance dated Mar. 31, 2014, for Korean priority Patent application 10-2012-0062874, (5 pages).

(Continued)

*Primary Examiner* — Long D Pham
(74) *Attorney, Agent, or Firm* — Lewis Roca Rothgerber Christie LLP

(57) ABSTRACT

A touch screen panel includes a transparent substrate, a first sensing line and a second sensing line. The first sensing line includes first sensing cells arranged along a first direction and first connection patterns coupling the first sensing cells. The second sensing line includes second sensing cells arranged in a second direction substantially perpendicular to the first direction, and second connection patterns coupling the second sensing cells. At least one of the first and the second sensing cells includes openings and conductive patterns located in the openings.

36 Claims, 9 Drawing Sheets

(56) References Cited

U.S. PATENT DOCUMENTS

| | | | |
|---|---|---|---|
| 2011/0063237 A1* | 3/2011 | Hung | 345/173 |
| 2011/0234510 A1 | 9/2011 | Jeong et al. | |
| 2011/0248953 A1 | 10/2011 | Lee et al. | |
| 2011/0254804 A1* | 10/2011 | Kuo | G06F 3/0418 345/174 |
| 2011/0291963 A1 | 12/2011 | Woo et al. | |

FOREIGN PATENT DOCUMENTS

| | | |
|---|---|---|
| KR | 10-2010-0095886 | 9/2010 |
| KR | 10-2011-0041043 | 2/2011 |
| KR | 10-2011-0041109 | 4/2011 |
| KR | 10-1040836 | 6/2011 |
| KR | 10-1040881 | 6/2011 |
| KR | 10-2012-0044500 | 5/2012 |

OTHER PUBLICATIONS

EPO Partial Search Report dated Nov. 8, 2016, for corresponding European Patent Application No. 13171530.2 (9 pages).

\* cited by examiner

TOUCH SCREEN PANEL HAVING A PLURALITY OF OPENINGS IN A PLURALITY OF SENSING CELLS

CROSS-REFERENCE TO RELATED APPLICATION

This application claims priority under 35 USC §119 to and the benefit of Korean Patent Application No. 10-2012-0062874 filed on Jun. 12, 2012 in the Korean Intellectual Property Office (KIPO), the contents of which are herein incorporated by reference in their entirety.

BACKGROUND

1. Field

Example embodiments of the present invention relate to touch screen panels.

2. Description of the Related Art

Recently, touch screen panels are widely being used for various display devices instead of input devices such as a remote control, a keyboard, a mouse, etc. The touch screen panel may be operated by touching information or icons thereon with a user's finger or a stylus pen. The touch screen panel may usually include a touching member for converting the position or the information selected by the user into an electrical signal, and then the touch screen panel may operate by the electrical signal.

The touch screen panels may be categorized as a capacitive type touch screen panel, a resistive type touch screen panel and an electromagnetic type touch screen panel in accordance with the sensing types of the touch screen panels.

The capacitive type touch screen panel may detect a touched position by sensing variation of electrostatic capacity generated in conductive sensing cells when the touch screen panel is touched by a user. The capacitive touch screen panel generally has a configuration in which the sensing cells cross each other to accurately detect the touched position. For example, the capacitive type touch screen panel includes first sensing lines and second sensing lines. The first sensing lines include a plurality of first sensing cells and first connection patterns for connecting the first sensing cells. The second sensing lines include a plurality of second sensing cells crossing the first sensing cells, and second connection patterns for connecting the second sensing cells. The first and the second sensing cells extend in directions that are perpendicular to each other. Here, the first and the second connection patterns have widths smaller than those of the first and the second sensing cells, respectively. Thus, each of the first and the second connection patterns has a relatively large resistance, and an insulation layer located between adjacent connection patterns has a relatively small thickness because of limitation of deposition process and dimensions of the touch screen panel.

In a conventional touch screen panel having the above-described configuration, external static electricity may flow into the touch screen panel through the first and the second sensing lines such that the static electricity may cause serious damages to the first and the second connection patterns of the first and the second sensing lines. If damages to the first and the second connection patterns are generated, the touch screen panel may not exactly detect and sense the touched position by the user. Thus, the failure of operation may occur in the touch screen panel because of the damages to the first and the second sensing lines.

SUMMARY

Example embodiments provide a touch screen panel that is capable of preventing failures of sensing and detecting operations by preventing or reducing damages to internal patterns through blocking or considerably reducing static electricity flowing into the touch screen panel.

In example embodiments according to the present invention, a touch screen panel is provided. The touch screen panel may include: a transparent substrate; a first sensing line including a plurality of first sensing cells arranged on the substrate along a first direction, and a plurality of first connection patterns coupling adjacent ones of the first sensing cells; and a second sensing line including a plurality of second sensing cells arranged on the substrate along a second direction perpendicular to the first direction, and a plurality of second connection patterns connecting adjacent ones of the second sensing cells, the second sensing line being electrically insulated from the first sensing line. Each of the first sensing cells may include a plurality of first openings and a plurality of first conductive patterns in the first openings, and each of the second sensing cells may include a plurality of second openings and a plurality of second conductive patterns in the second openings.

The first openings may be arranged along the second direction and the second opening may be arranged along the first direction.

The first openings and the second openings may be arranged in zigzag patterns, respectively.

Each of the first and the second openings may have a circle shape, an ellipse shape, a diamond shape, a rhombus shape or a polygon shape.

The first conductive patterns in the first openings may have island shapes and the second conductive patterns in the second openings may have island shapes.

Each of the first sensing cells and the second sensing cells may include a transparent conductive material.

The first conductive patterns and the second conductive patterns may include materials that are same as or substantially similar to materials of the first sensing cells and the second sensing cells, respectively.

Each of the first sensing cells and the second sensing cells may have a diamond shape, a rhombus shape or a square shape having rounded or cut corners.

The first connection patterns may be integrally formed with the first sensing cells, and the second connection patterns may be separated from the first connection patterns and partially overlapped with the first connection patterns, respectively.

A pair of the second connection patterns may be between adjacent ones of the second sensing cells and one of the first connection patterns may be between the pair of the second connection patterns.

Each of the first sensing cells may include a dummy opening having a slot shape extending in the second direction, the dummy opening being adjacent each first connection pattern, and each of the second connection patterns may include: a bridge pattern in the dummy opening and having an island shape; and a pair of wiring patterns electrically connecting the bridge pattern to the second sensing cells, the wiring patterns being positioned at a level different from that of the first sensing cells and the second sensing cells.

The dummy opening may be located between the first connection pattern and the first opening.

The bridge pattern may include a transparent conductive material and each of the wiring patterns may include metal or a conductive metal compound.

Each of the first sensing cells may further include a third opening including a first extension portion and a second extension portion substantially parallel to two sides of each first sensing cell adjacent to the first connection pattern, and may further include a first central portion coupling the first extension portion to the second extension portion. Each of the second sensing cells may further include a fourth opening including a third extension portion and a fourth extension portion substantially parallel to two sides of each second sensing cell adjacent to the second connection pattern, and may further include a second central portion coupling the third extension portion to the fourth extension portion.

The first central portion may include a first sub-central portion substantially parallel to the first extension portion and a second sub-central portion parallel to the second extension portion, and the second central portion may include a third sub-central portion substantially parallel to the third extension portion and a fourth sub-central portion parallel to the fourth extension portion.

The first openings may be between one side of the first sensing cell adjacent to the first connection pattern and the first extension portion and between another side of the first sensing cell adjacent the first connection pattern and the second extension portion. The second openings may be located between one side of the second sensing cell adjacent to the second connection pattern and the third extension portion and between another side of the second sensing cell adjacent to the second connection pattern and the fourth extension portion.

The first openings located between one side of the first sensing cell adjacent to the first connection pattern and the first extension portion may be substantially parallel to one side of the first sensing cell, and the first openings located between another side of the first sensing cell adjacent the first connection pattern and the second extension portion may be substantially parallel to another side of the first sensing cell. The second openings located between one side of the second sensing cell adjacent to the second connection pattern and the third extension portion may be substantially parallel to one side of the second sensing cell, and the second openings located between another side of the second sensing cell adjacent the second connection pattern and the fourth extension portion may be substantially parallel to another side of the second sensing cell.

Each of the first sensing cells may further include a third conductive pattern in the third opening, and each of the second sensing cells may further include a fourth conductive pattern in the fourth opening.

The third conductive pattern in the third opening may have an island shape, and the fourth conductive pattern in the fourth opening may have an island shape.

The touch screen panel may further include at least one first lightning conductor positioned at a level different from that of the first sensing cell and the third conductive pattern, the at least one first lightning conductor including one end electrically connected to the first sensing cell and another end partially overlapped with the third conductive pattern; and at least one second lightning conductor positioned at a level different from that of the second sensing cell and the fourth conductive pattern, the at least one second lightning conductor including one end electrically connected to the second sensing cell and another end partially overlapped with the fourth conductive pattern.

Each of the first and the second lightning conductors may include metal or a conductive metal compound.

The first lightning conductor may be at one end of the third conductive pattern, and the second lightning conductor may be at one end of the fourth conductive pattern.

Each of the first sensing cells may further include: a plurality of fifth openings having slot shapes extending in the second direction and being arranged in substantially parallel to one another; and a plurality of fifth conductive patterns in the fifth openings, respectively.

The fifth openings may be located between the first connection patterns and the third opening.

Each fifth conductive pattern located in each fifth opening may have an island shape.

Each of the fifth conductive patterns may include a transparent conductive material.

The fifth openings may have different lengths from each other.

The touch screen panel may further include dummy wiring patterns located at a level different from that of the fifth conductive patterns and the second sensing cells, wherein the dummy wiring patterns electrically connect the fifth conductive patterns to adjacent ones of the second sensing cells.

Each of the dummy wiring patterns may include metal or a conductive metal compound.

The dummy wiring patterns may respectively extend in different directions relative to the fifth conductive patterns.

In example embodiments according to the present invention, a touch screen panel is provided. The touch screen panel may include: a transparent substrate; a first sensing line including a plurality of first sensing cells arranged in a first direction and a plurality of first connection patterns coupling adjacent ones of the first sensing cells; and a second sensing line electrically insulated from the first sensing line, the second sensing line including a plurality of second sensing cells arranged in a second direction perpendicular to the first direction and a plurality of second connection patterns coupling adjacent ones of the second sensing cells. At least one of the first sensing cells or the second sensing cells may comprise openings and conductive patterns in the openings.

Each of the first sensing cells may include first openings having slot shapes and being adjacent to the first connection patterns, and first conductive patterns in the first openings.

Each of the second sensing cells may include second openings having slot shapes and being adjacent to the second connection patterns, and second conductive patterns in the second openings.

Each of the first conductive patterns in the first opening may have an island shape, and each of the second conductive patterns in the second opening may have an island shape.

Each of the first sensing cells may further include a plurality of first protruding portions extending from inner sidewalls of the first openings, the first protruding portions being separated from one another, and each of the second sensing cells may further include a plurality of second protruding portions extending from inner sidewalls of the second openings, the second protruding portions being separated from one another.

Each of the first conductive patterns may further include a plurality of third protruding portions corresponding to the first protruding portions, respectively, and each of the second conductive patterns may further include a plurality of fourth protruding portions corresponding to the second protruding portions, respectively.

According to example embodiments, the first and the second sensing cells of the touch screen panel may include one or more openings provided adjacent to intersection portions between the first sensing lines and the second sensing lines, particularly the first and the second connection patterns. Additionally, conductive patterns may be respectively disposed in the openings. The static electricity flowed in the touch screen panel from the outside may be accumulated on the conductive patterns, so that the static electricity may be significantly reduced or removed. As a result, the damages to the components or the patterns of the touch screen panel may be effectively prevented to thereby improve the failures of touch operation of the touch screen panel.

BRIEF DESCRIPTION OF THE DRAWINGS

Example embodiments will be more clearly understood from the following detailed description taken in conjunction with the accompanying drawings. FIGS. 1 to 9 represent non-limiting, example embodiments as described herein.

FIG. 1 is a plan view illustrating a touch screen panel in accordance with example embodiments.

FIG. 2 is an enlarged plan view illustrating a portion of a touch screen panel in accordance with example embodiments.

FIG. 4 is an enlarged plan view illustrating a portion of a touch screen panel in accordance with some example embodiments.

FIG. 5 is an enlarged plan view illustrating a portion of a touch screen panel in accordance with some example embodiments.

FIG. 7 is an enlarged plan view illustrating a portion of a touch screen panel in accordance with some example embodiments.

FIG. 8 is an enlarged plan view illustrating a portion of a touch screen panel in accordance with some example embodiments.

FIG. 9 is a partially enlarged plan view illustrating a first opening of the touch screen panel in FIG. 8.

DETAILED DESCRIPTION OF EMBODIMENTS

Figure 1:
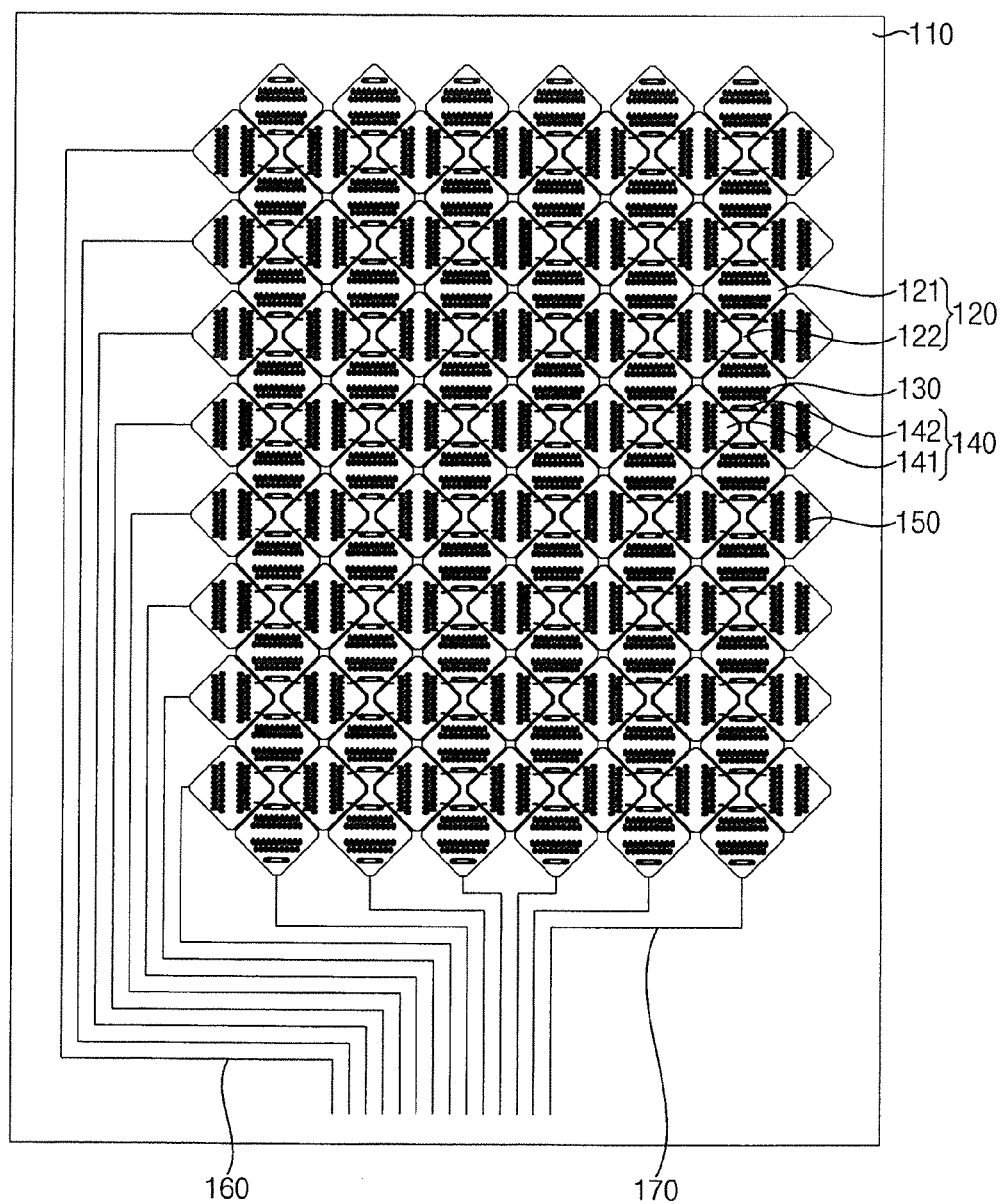

Various example embodiments will be described more fully hereinafter with reference to the accompanying drawings, in which some example embodiments are shown. The invention may, however, be embodied in many different forms and should not be construed as limited to the example embodiments set forth herein. Rather, these example embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, components, and/or groups, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
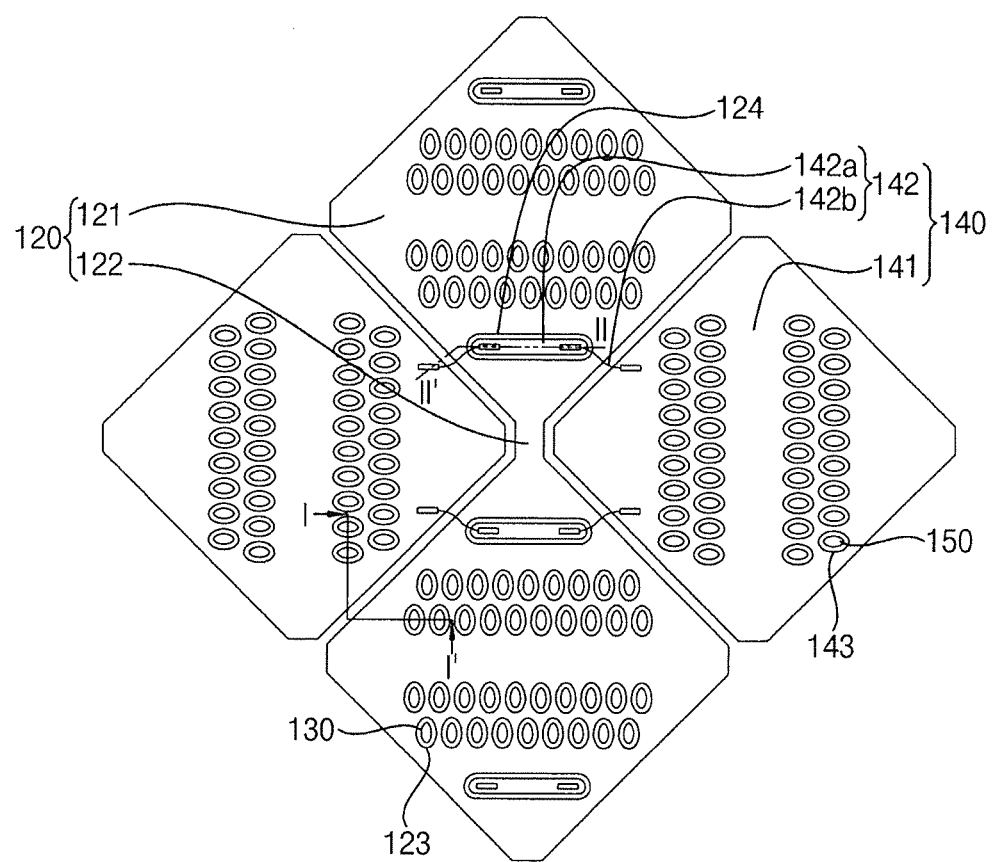
Figure 3A:
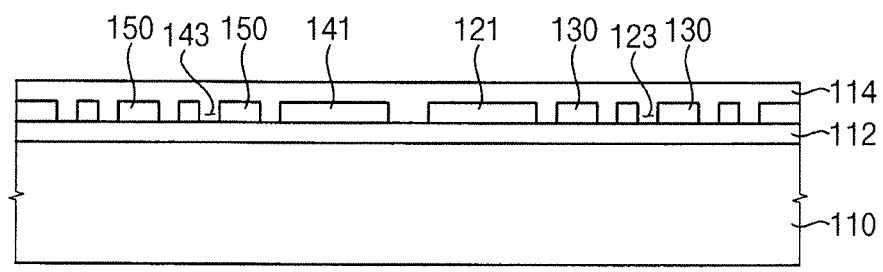
FIG. 3A is a cross-sectional view illustrating the touch screen panel taken along the line I-I' in FIG. 2.
Figure 3B:
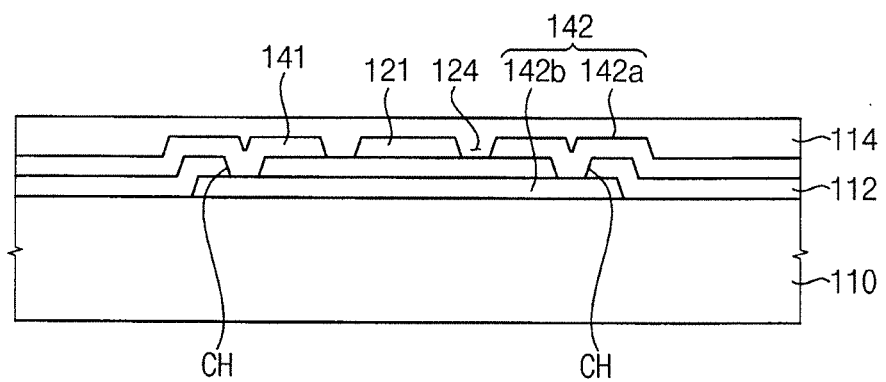
FIG. 3B is a cross-sectional view illustrating the touch screen panel taken along the line II-II' in FIG. 2.

FIG. 1 is a plan view illustrating a touch screen panel in accordance with example embodiments. FIG. 2 is an enlarged plan view illustrating a portion of a touch screen panel in accordance with example embodiments. In addition, FIG. 3A is a cross-sectional view illustrating the touch screen panel taken along the line I-I' in FIG. 2, and FIG. 3B is a cross-sectional view illustrating the touch screen panel taken along the line II-II' in FIG. 2.

Referring to FIGS. 1, 2, 3A and 3B, a touch screen panel 100 according to example embodiments may include a transparent substrate 110, first sensing lines 120, first conductive patterns 130, second sensing lines 140, second conductive patterns 150, first detecting lines 160, second detecting lines 170, etc.

The transparent substrate 110 may include a transparent insulation material. For example, the transparent substrate 110 may include a glass substrate, a transparent plastic substrate, a transparent fabric substrate, a transparent film substrate, etc.

In example embodiments, the transparent substrate 110 may have a sensing region and a peripheral region. The sensing region substantially may be a central region of the transparent substrate 110. The first and the second sensing lines 120 and 140 may be located in the sensing region. A sensing operation of the touch screen panel 100 may be substantially carried out in the sensing region in accordance with a user's touching of the touch screen panel 100. The peripheral region may substantially surround the sensing region. The first and the second detecting lines 160 and 170 may be positioned in the peripheral region of the transparent substrate 110.

The first sensing lines 120 may extend on the transparent substrate 110 along a first direction. Here, the first direction may be, for example, a longitudinal direction of the transparent substrate 110. Alternatively, the first direction may be a transverse direction of the transparent substrate 110.

In example embodiments, a plurality of first sensing lines 120 may be located on the transparent substrate 110. The plurality of first sensing lines 120 may be separated from one another (e.g., separated by predetermined distances), and may be substantially arranged in parallel.

Each of the first sensing lines 120 may include a plurality of first sensing cells 121 and a plurality of first connection patterns 122. The first sensing cells 121 may be arranged along the first direction, and adjacent first sensing cells 121 may be spaced apart from each other (e.g., spaced by a predetermined distance). Each of the first connection patterns 122 may be positioned between adjacent first sensing cells 121. Each first connection pattern 122 may connect or couple one first sensing cell 121 to another first sensing cell 121. In example embodiments, each first connection pattern 122 may connect or couple a first portion (e.g., a lower portion) of one first sensing cell 121 to a portion (e.g., an upper portion) of an adjacent first sensing cell 121. As such, adjacent first sensing cells 121 may be substantially sequentially connected or coupled to one another by the first connection patterns 122 so that the first sensing lines 120 extending in the first direction may be provided on the transparent substrate 110.

The first sensing cells 121 may substantially detect the variation of electrostatic capacity accordingly as the user touches the touch screen panel 100. In example embodiments, each of the first sensing cells 121 may have a substantially diamond shape, a substantially rhombus shape, a substantially square shape having processed corners such as rounded corners or cut corners, etc. However, the shapes of the first sensing cells 121 may not be limited to these shapes, and thus the first sensing cells 121 may have various shapes in accordance with that of the touch screen panel 100.

Each first sensing cell 121 may include a transparent conductive material. For example, each first sensing cell 121 may include indium zinc oxide (IZO), indium tin oxide (ITO), antimony tin oxide (ATO), zinc oxide (ZnOx), indium gallium oxide (IGO), gallium oxide (GaOx), tin oxide (SnOx), etc. These may be used alone or in combination with one or more other transparent conductive materials.

Each first connection pattern 122 may have a width that is smaller (e.g., substantially smaller) than that of each first sensing cell 121. In example embodiments, the first connection pattern 122 may include a material that is substantially the same as or substantially similar to that included in the first sensing cell 121. For example, each of the first connection patterns 122 may include at least one of the above-mentioned transparent conductive materials. When the first connection patterns 122 and the first sensing cells 121 include substantially the same materials, the first connection patterns 122 may be integrally formed with the first sensing cells 121. In some example embodiments, each first connection pattern 122 may include metal or a conductive metal compound. That is, the first connection pattern 122 may include a material substantially different from that of the first sensing cell 121. For example, each of the first connection patterns 122 may include silver (Ag), copper (Cu), palladium (Pa), cobalt (Co), chrome (Cr), nickel (Ni), gold (Au), oxides thereof, etc. These may be used alone or in combination with one or more of other above-referenced materials. When the first connection pattern 122 includes metal or a conductive metal compound, the first connection pattern 122 may be partially overlapped with the first sensing cell 121, so that the first connection pattern 122 may be electrically connected or electrically coupled to the first sensing cell 121.

In some example embodiments, insulation layer patterns (not illustrated) may be provided between the first sensing cells 121 and the first connection patterns 122 when each of the first connection patterns 122 includes a metal or a metal compound. In this case, each first connection pattern 122 may pass through the insulation layer pattern to make contact with the first sensing cell 121. That is, the first connection patterns 122 may substantially fill contact holes (not illustrated) of the insulation layer patterns exposing the first sensing cells 121, respectively.

In example embodiments, a plurality of first openings 123 may be formed at portions of the first sensing cells 121 (e.g., at portions of the first sensing cells 121 that are adjacent the first connection patterns 122). First conductive patterns 130 may be located in the first openings 123, respectively. The first conductive patterns 130 may remove or reduce (e.g., considerably reduce) static electricity flowing into the touch screen panel 100 from an outside. Thus, each of the first sensing cells 121 may include the plurality of first openings 123 and the plurality of first conductive patterns 130. For example, the first openings 123 may have various plane shapes such as a substantially circular shape, a substantially elliptical shape, a substantially track shape, a substantially polygonal shape, etc. The first conductive patterns 130 may be located as island structures in the first openings 123, respectively. However, the shapes of the first conductive patterns 130 may vary in accordance with those of the first openings 123.

The first conductive patterns 130 may remove or reduce (e.g., greatly reduce) the static electricity flowing through the first sensing lines 120 from the outside. The static electricity flowing through the first sensing lines 120 may be accumulated in the first conductive patterns 130 located in the first openings 123, so that the static electricity may be removed or the amount of the static electricity may be reduced (e.g., greatly reduced) by the first conductive patterns 130. For example, negative (−) charges may be accumulated at surfaces of the first conductive patterns 130 when the positive (+) charges of the static electricity flow into the first conductive patterns 130 from the outside. The positive charges of the static electricity may be trapped by the negative charges of the first conductive patterns 130, and thus the static electricity may be reduced (e.g., significantly reduced) or removed. The static electricity passing through the first sensing lines 120 may flow along a direction in which the first sensing lines 120 extend. For example, the static electricity may flow in the first direction. Damages caused by the static electricity may be primarily caused at the first connection patterns 122 having relatively small dimensions and adjacent components or patterns. According to example embodiments, the first openings 123 and the first conductive patterns 130 may be located adjacent or near the first connection patterns 122 so as to effectively prevent the damages to the first connection patterns 122 and the components or patterns adjacent the first connection patterns 122.

Referring now to FIGS. 1 to 3B, both lateral portions of each first sensing cell 121 (e.g., upper and lower portions of each first sensing cell 121) may be connected or coupled to adjacent first connection patterns 122. Hence, the first openings 123 may be positioned near the lateral portions of the first sensing cell 121. For example, the first openings 123 may be located in portions of the first sensing cells 121 adjacent the upper and the lower portions thereof. Additionally, one first connection pattern 122 may be positioned between a set of the first openings 123 of one first sensing cell 121 and another set of the first openings 123 of adjacent first sensing cell 121 along the first direction. The first openings 123 may be arranged along a second direction substantially perpendicular to the first direction. The sets of the first openings 123 of the first sensing cell 121 may be arranged in rows or columns. When the first openings 123 are entirely arranged in a substantially matrix structure or configuration, spaces between adjacent first openings 123 may serve as passages where the static electricity directly flows.

In example embodiments, the first openings 123 may be arranged in a substantially zigzag structure (or pattern) along the second direction. When the first openings 123 are entirely arranged in the matrix structure or configuration, the static electricity may take a long way around the first openings 123 because the first openings 123 in a next row or column may be located between the first openings 123 in a previous row or column. Therefore, the static electricity may be more effectively reduced or removed because of the first conductive patterns 130 located in the first openings 123 having the zigzag arrangement.

In example embodiments, the first conductive patterns 130 may have shapes that are substantially the same as or substantially similar to those of the first openings 123. However, dimensions of the first conductive patterns 130 may be substantially smaller than those of the first openings 123. When the first conductive patterns 130 may have the shapes that are substantially the same as those of the first openings 123, the first conductive patterns 130 may be spaced (e.g., uniformly spaced) apart from inner sidewalls of the first openings 123, respectively. That is, spaces may be provided between the first conductive patterns 130 and the inner sidewalls of the first openings 123, respectively. Further, the first conductive patterns 130 may be positioned at a level substantially the same as a level at which other portions of the first sensing cells 121 are located. In other words, the first conductive patterns 130 and the first sensing cells 121 may be located on one plane.

As illustrated in FIGS. 3A and 3B, a protection layer 114 may be located on the first sensing cells 121 and the first conductive patterns 130. The protection layer 114 may be additionally formed in the spaces between the first conductive patterns 130 and the inner sidewalls of the first openings 123. For example, the first protection layer 114 may include silicon oxide (SiOx), silicon nitride (SiNx), magnesium fluoride (MgFx), or any suitable transparent organic material. Portions of the protection layer 114 may serve as dielectric layers between the first conductive patterns 130 and the inner sidewalls of the first openings 123. Thus, capacitors including the first conductive patterns 130, the portions of the protection layer 114 and adjacent portions of the first sensing cell 121 may be provided in the first sensing cells 121, so that the static electricity flowing from the outside may be more efficiently removed by accumulating the static electricity in the capacitors. Here, the distances between the first conductive patterns 130 and the inner sidewalls of the first openings 123 may be properly adjusted such that the capacitors may ensure predetermined capacitances by the portions of the protection layer 114 located in the spaces between the first conductive patterns 130 and the inner sidewalls of the first openings 123.

Each of the first conductive patterns 130 may include a material substantially the same as or substantially similar to that included in each first sensing cell 121. For example, each first conductive pattern 130 may include a transparent conductive material. Examples of the transparent conductive material may include indium zinc oxide (IZO), indium tin oxide (ITO), antimony tin oxide (ATO), indium gallium oxide (IGO), zinc oxide (ZnOx), tin oxide (SnOx), gallium oxide (GaOx), etc. These may be used alone or in combination with one or more other transparent conductive materials.

As illustrated in FIGS. 1 to 3B, each of the first sensing cells 121 may additionally include a dummy opening 124. The dummy opening 124 may extend along the second direction. For example, the dummy opening 124 may have a substantially slot or slit shape or a substantially elliptical shape having a predetermined length. The dummy opening 124 may be located between the set of the first openings 123 and the first connection pattern 122. As described below, a second connection pattern 142 of the second sensing line 140 may be located in the dummy opening 124.

The second sensing lines 140 may extend on the transparent substrate 110 along the second direction. Here, the second direction may be substantially perpendicular to the first direction. For example, the second sensing lines 140 may be substantially perpendicular to the first sensing lines 120. In example embodiments, a plurality of second sensing lines 140 may be provided on the transparent substrate 110. These second sensing lines 140 may be substantially parallel to one another along the second direction.

In example embodiments, each of the second sensing lines 140 may include a plurality of second sensing cells 141 and a plurality of second connection patterns 142. In this case, the second sensing lines 140 may be electrically insulated from the first sensing lines 120, respectively. When the second sensing lines 140 are substantially perpendicular to the first sensing lines 120, the second sensing lines 140 may partially cross the first sensing lines 120. For example, the first and the second sensing lines 120 and 140 may have a configuration in which the first connection patterns 122 are adjacent the second connection patterns 142. Here, the first connection patterns 122 may be spaced apart from the second connection patterns 142 by relatively small distances. In some example embodiments, the first connection patterns 122 of the first sensing lines 120 may be substantially partially overlapped with the second connection patterns 142 of the second sensing lines 140.

In each second sensing line 140, the second sensing cells 141 may be arranged along the second direction, and adjacent second cells 141 may be separated from each other (e.g., separated by a predetermined distance). Here, the second sensing cells 141 may not be substantially overlapped with the adjacent first sensing cells 121. The first and the second sensing cells 121 and 141 may be located on one plane. For example, the second sensing cells 141 may be positioned at a level substantially the same as a level at which the first sensing cells 121 are located. Each of the second connection patterns 142 may be located between adjacent second sensing cells 141, and thus adjacent second sensing cells 141 may be electrically connected to one another by the second connection patterns 142. For example, each of the second connection patterns 142 may electrically connect a lateral portion of one second sensing cell 141 (e.g., a left portion of the second sensing cell 141) to a lateral portion of another second sensing cell 141 (e.g., a right portion of the adjacent second sensing cell 141). In this manner, the second sensing cells 141 may be electrically connected to one another by the second connection patterns 142, so that the second sensing lines 140 extending in the second direction may be provided on the transparent substrate 110.

In example embodiments, the second sensing cells 141 may substantially detect the variation of static capacitance caused by the user's touch about the touch screen panel 100. For example, each of the second sensing cells 141 may have various plane shapes such as a substantially diamond shape, a substantially rhombus shape, a substantially square shape including rounded or cut corners. However, the shapes of the second sensing cells 141 may not be limited to these shapes. The shapes of the second sensing cells 141 may vary in accordance with the shapes of the touch screen panel 100.

When the first sensing cells 121 have shapes that are substantially the same as those of the second sensing cells 141, the first and the second sensing cells 121 and 141 may be closely arranged on the transparent substrate 110 without any overlaps between the first sensing cells 121 and the second sensing cells 141. FIG. 2 illustrates the first and the second sensing cells 121 and 141 having the substantial diamond shapes closely arranged. Each of the second sensing cells 141 may include a transparent conductive material. For example, each second sensing cell 141 may include indium zinc oxide, indium tin oxide, antimony tin oxide, indium gallium oxide, zinc oxide, gallium oxide, tin oxide, etc. These may be used alone or in combination with one or more other transparent conductive materials.

In example embodiments, each second connection pattern 142 may have a width relatively smaller than that of each second sensing cell 141. The second connection patterns 142 may be substantially overlapped with the first sensing cells 121, respectively. Overlapped regions between the second connection patterns 142 and the first sensing cells 121 may advantageously have as small areas as possible. Considering this matter, a pair of second connection patterns 142 may be located between adjacent second sensing cells 141. When two of the second connection patterns 142 are positioned between adjacent second sensing cells 141, the second connection patterns 142 may have reduced widths, respectively.

Each first connection pattern 121 may be located between the pair of the second connection patterns 142. Here, each second connection pattern 142 may include a bridge pattern 142a and a pair of wiring patterns 142b. The bridge pattern 142a may be positioned in the dummy opening 124 provided in the first sensing cell 121. The bridge pattern 142a may have an island shape in the dummy opening 124, and may be located at a level that is substantially the same as a level at which the first sensing cell 121 is positioned. The two wiring patterns 142b may be located on a plane substantially different from a plane on which the first and the second sensing cells 121 and 141 are positioned. For example, the wiring patterns 142b may be higher (e.g., substantially higher) than the first and the second sensing cells 121 and 141. Further, the pair of the wiring patterns 142b may connect or couple end portions of the bridge pattern 142a to adjacent second sensing cells 141, respectively. Each of the wiring patterns 142b may have a width that is relatively smaller than that of the bridge pattern 142a. Here, each wiring pattern 142b may include metal or a conductive metal compound to reduce the resistance thereof. In some example embodiments, each of the bridge pattern 142a and/or the wiring patterns 142b may include a material that is substantially the same as or substantially similar to that of the first sensing cell 121. For example, each of the bridge pattern 142a and/or the wiring patterns 142b may include a transparent conductive material.

The wiring patterns 142b and the bridge pattern 142a may be located on different planes, respectively. In example embodiments, the wiring patterns 142b may be located over the transparent substrate 110, and an insulation layer 112 may be formed on the wiring patterns 142b. Here, the insulation layer 112 may include contact holes (CH) located at end portions of each wiring pattern 142b. The bridge pattern 142a may be located on the insulation layer 112. The bridge pattern 142a may pass through the contact holes (CH) of the insulation layer 112 to make contact with the wiring patterns 142b. Further, the wiring patterns 142b may be electrically connected or electrically coupled to the second sensing cells 141 through the contact holes (CH) of the insulation layer 112.

In example embodiments, each of the second sensing cells 141 may include a plurality of second openings 143 adjacent the second connection patterns 122. Additionally, each second sensing cell 141 may include second connection patterns 150 located in the second openings 143 for removing or reducing (e.g., considerably reducing) the static electricity. For example, each of the second openings 143 may have various plane shapes such as a substantially circular shape, a substantially elliptical shape, a substantially polygonal shape, etc. In addition, the second connection patterns 150 may have island shapes located in the second openings 143, respectively. The second connection patterns 150 may also remove or reduce (e.g., greatly reduce) the static electricity flowed from the outside. Here, the static electricity may be accumulated on and/or in the second connection patterns 150 located in the second openings 143, and thus the energy of the static electricity may be considerably reduced or consumed in the second connection patterns 150. That is, the static electricity may be removed or reduced (e.g., greatly reduced) by the second connection patterns 150 as similar to the first connection patterns 130. The static electricity introduced from the outside may flow in the second direction through the second sensing lines 140. The static electricity may primarily cause damages to the second connection patterns 142 having relatively small dimensions and adjacent components. To effectively prevent the damages to second connection patterns 142 and adjacent components, the second openings 143 and the second connection patterns 150 may be located adjacent the second connection patterns 142.

According to example embodiments, the second openings 143 may be provided at the lateral portions of each second sensing cell 141 when the lateral portions of each second sensing cell 141 (e.g., the left and the right portions of each second sensing cell 141) are connected or coupled to the second connection patterns 142. For example, a plurality of second openings 143 may be formed at the left and the right portions of each second sensing cell 141. The second openings 143 may be adjacent to the second connection patterns 142 along the second direction. For example, the plurality of the second openings 143 may be arranged in the second direction substantially perpendicular to the first direction. Further, the sets of the second openings 143 may be arranged in a plurality of rows or columns. As for the second sensing lines 140, the passage of the static electricity may take a long way to effectively prevent the damage to the second connection patterns 142 and adjacent components. When the second openings 143 are arranged in a substantially matrix structure or configuration, spaces between adjacent second openings 143 may serve as the passage of the static electricity. To achieve the effective detour of the static electricity in the second sensing lines 140, the second openings 143 may be arranged in a substantially zigzag structure (or pattern) along the first direction. When the plurality of the second openings 143 are arranged in the zigzag configuration, the rows or the columns of the second openings 143 may be alternatively arranged, such that the static electricity may take a long way around the second openings 143. Therefore, the second conductive patterns 150 located in the second openings 143 may more efficiently remove or reduce the static electricity flowing through the second sensing lines 140.

In example embodiments, each second conductive pattern 150 may have a shape that is substantially the same as or substantially similar to that of each second opening 143. Here, each second conductive pattern 150 may be spaced apart from an inner side wall of each second opening 143 (e.g., spaced by a predetermined distance). In addition, the second conductive patterns 150 may include materials that are substantially the same as or substantially similar to those included in the second sensing cells 140, respectively. For example, each second conductive pattern 150 may include a transparent conductive material. Examples of the transparent conductive material may include indium zinc oxide, indium tin oxide, indium gallium oxide, antimony tin oxide, zinc oxide, tin oxide, gallium oxide, etc. These may be used alone or in combination with one or more other transparent conductive materials.

In the touch screen panel 100 according to example embodiments, the static electricity, which flows into the touch screen panel 100 through the first sensing lines 120 from the outside, may jump toward the second sensing lines 140 at portions where the second sensing lines 140 cross over the first sensing lines 120. Hence, the static electricity may flow into all of the first and the second sensing lines 120 and 140 although the static electricity is introduced through the first sensing lines 120. Similarly, the static electricity may flow into all of the first and the second sensing lines 120 and 140 if the static electricity is introduced through the second sensing line 140 only, because the static electricity may jump into the first sensing lines 120 at the portions where the first and the second sensing lines 120 and 140 cross one another. To effectively remove or considerably reduce the static electricity flowing into the first sensing lines 120 and/or the second sensing lines 140, the first and the second openings 123 and 143 may substantially enclose the first and the second connection patterns 122 and 142, respectively. For example, the set of the first openings 123 and the set of the second openings may substantially enclose the first and the second connection patterns 122 and 142 as well as the portions where the first and the second sensing lines 120 and 140 are crossed.

As illustrated in FIG. 1, the first detecting lines 160 may be electrically connected or electrically coupled to the first sensing lines 120, respectively. The first detecting lines 160 may transfer sensing signals detected by the first sensing lines 120 to an external control member (not illustrated). In example embodiments, each of the first detecting lines 160 may correspond to each of the first sensing lines 120. That is, the number of the first detecting lines 160 may be substantially the same as the number of the first sensing lines 120. Each first detecting line 160 may be connected to or coupled to an end portion of each first sensing line 120. All of the first detecting lines 160 may converge on a portion of the transparent substrate 110 to be connected or coupled to the external control member.

The second detecting lines 170 may be electrically connected or electrically coupled to the second sensing lines 140, respectively. The second detecting lines 170 may also transfer sensing signals detected by the second sensing lines 140 to the external control member. Additionally, the number of the second detecting lines 170 may be substantially the same as the number of the second sensing lines 140. When a plurality of second sensing lines 140 are provided on the transparent substrate 110, a plurality of second detecting lines 170 may be respectively connected or coupled to corresponding second sensing lines 140. First end portions of the second detecting lines 170 may be connected or coupled to end portions of the second sensing lines 140 whereas second end portions of the second detecting lines 170 may converge on the portion of the transparent substrate 110 to be easily connected or coupled to the external control member. In example embodiments, all of the first and the second detecting lines 160 and 170 may be bended (or bent) and converged on the same region of the transparent substrate 110.

In the touch screen panel 100 according to example embodiments, the static electricity flowed from the outside may be removed or reduced (e.g., considerably reduced) by the first and the second conductive patterns 130 and 150 located in the first and the second openings 123 and 143. The damages to the first and the second sensing lines 120 and 140 may be effectively prevented, so that the failure of the sensing operation of the touch screen panel 100 may also be prevented.

Figure 4:
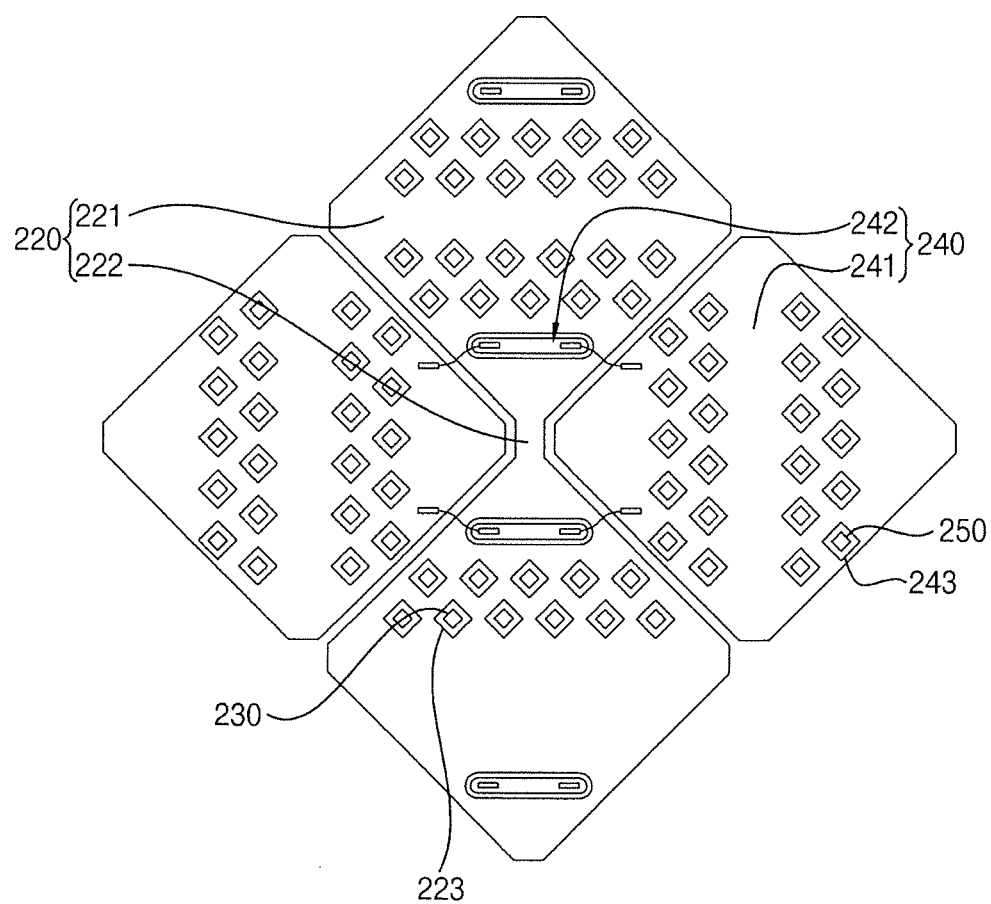

FIG. 4 is an enlarged plan view illustrating a portion of a touch screen panel in accordance with some example embodiments. The touch screen panel 200 illustrated in FIG. 4 may have constructions that are substantially the same as or substantially similar to those of the touch screen panel 100 described with reference to FIGS. 1 to 3B except for openings and conductive patterns. In reference to FIG. 4, detailed descriptions of components that are substantially the same as or substantially similar to those illustrated in FIGS. 1 to 3B may be omitted.

Referring to FIGS. 1 and 4, the touch screen panel 200 may include a transparent substrate 110, first sensing lines 220, first conductive patterns 230, second sensing lines 240, second conductive patterns 250, first detecting lines 160, second detecting lines 170, etc.

The first sensing lines 220 may extend on the transparent substrate 110 along a first direction. Each of the first sensing lines 220 may include a plurality of first sensing cells 221 arranged along the first direction, and a plurality of first connection patterns 222 for connecting or coupling the first sensing cells 221 one after another.

Each first sensing cell 221 may include the first connection pattern 222 and a plurality of first openings 223, which may be adjacent the first connection pattern 222. First conductive patterns 230 may be located in the first openings 223, respectively. The first openings 223 may be arranged along a second direction that is substantially perpendicular to the first direction. Further, sets of the first openings 223 may be arranged in a plurality of rows or a plurality of columns, and thus all of the first openings 223 may be arranged in a substantially zigzag structure (or pattern).

As illustrated in FIG. 4, each first opening 223 may have various plane shapes such as a substantially diamond shape, a substantially rhombus shape, a substantially square shape, etc. When the first openings 223 have these plane shapes, the first openings 223 may be substantially closely arranged.

The first conductive patterns 230 may have shapes that are substantially the same as or substantially similar to those of the first openings 223. For example, each first conductive pattern 230 may have various plane shapes such as a substantially diamond shape, a substantially rhombus shape, a substantially square shape, etc. As described above, the first conductive patterns 230 may remove or reduce (e.g., considerably reduce) static electricity flowed through the first sensing lines 220 from an outside.

When the first openings 223 and the first conductive patterns 230 have the plane shapes such as the substantial diamond shapes, the first openings 223 and the first conductive patterns 230 may be arranged more closely to one another. Thus, spaces between adjacent first openings 223 may become small to thereby more effectively remove or reduce the static electricity by such a configuration of the first openings 223 and the first conductive patterns 230.

Referring now to FIGS. 1 and 4, the second sensing lines 240 may extend on the transparent substrate 110 along a second direction that is substantially perpendicular to the first direction. Each of the second sensing lines 240 may include a plurality of second sensing cells 241 arranged in the second direction and a plurality of second connection patterns 242 for connection of adjacent second sensing cells 241.

Each second sensing cell 241 may include a plurality of second openings 243, which may be adjacent the second connection patterns 242. Second conductive patterns 250 may be positioned in the second openings 243, respectively. Each of the second conductive patterns 250 may be separated from an inner sidewall (e.g., inner sidewalls) of each of the second openings 243. For example, each second conductive pattern 250 may have a substantially island shape located in each second opening 243. The second openings 243 may be arranged in a plurality of rows or a plurality of columns along the first direction. Here, the second openings 243 may be entirely arranged in a substantially zigzag structure (or pattern) as similar to that of the first openings 223.

In example embodiments, each second opening 243 may have a plane shape, for example, a substantially diamond shape, a substantially rhombus shape, a substantially square shape, etc. When the second openings 243 have such a plane shape, the number of the second openings 243 per unit area may be increased. That is, the second openings 243 may be more closely arranged in the unit area of the touch screen panel 200.

As illustrated in FIG. 4, the second conductive patterns 250 may have shapes substantially the same as or substantially similar to those of the second openings 243. For example, each second conductive pattern 250 may have a plane shape such as a substantially diamond shape, a substantially rhombus shape, a substantially square shape, etc.

The second conductive patterns 250 may also remove or reduce (e.g., greatly reduce) the static electricity flowing through the second sensing lines 240 from the outside. In example embodiments, the second openings 243 and the second conductive patterns 250 may be arranged more closely to one another when the second openings 243 and the second conductive patterns 250 have the substantial diamond shapes. Thus, the second conductive patterns 250 may also more effectively remove or reduce the static electricity because spaces between adjacent second openings 243 through which the static electricity can pass, may be reduced (e.g., considerably reduced).

Figure 5:
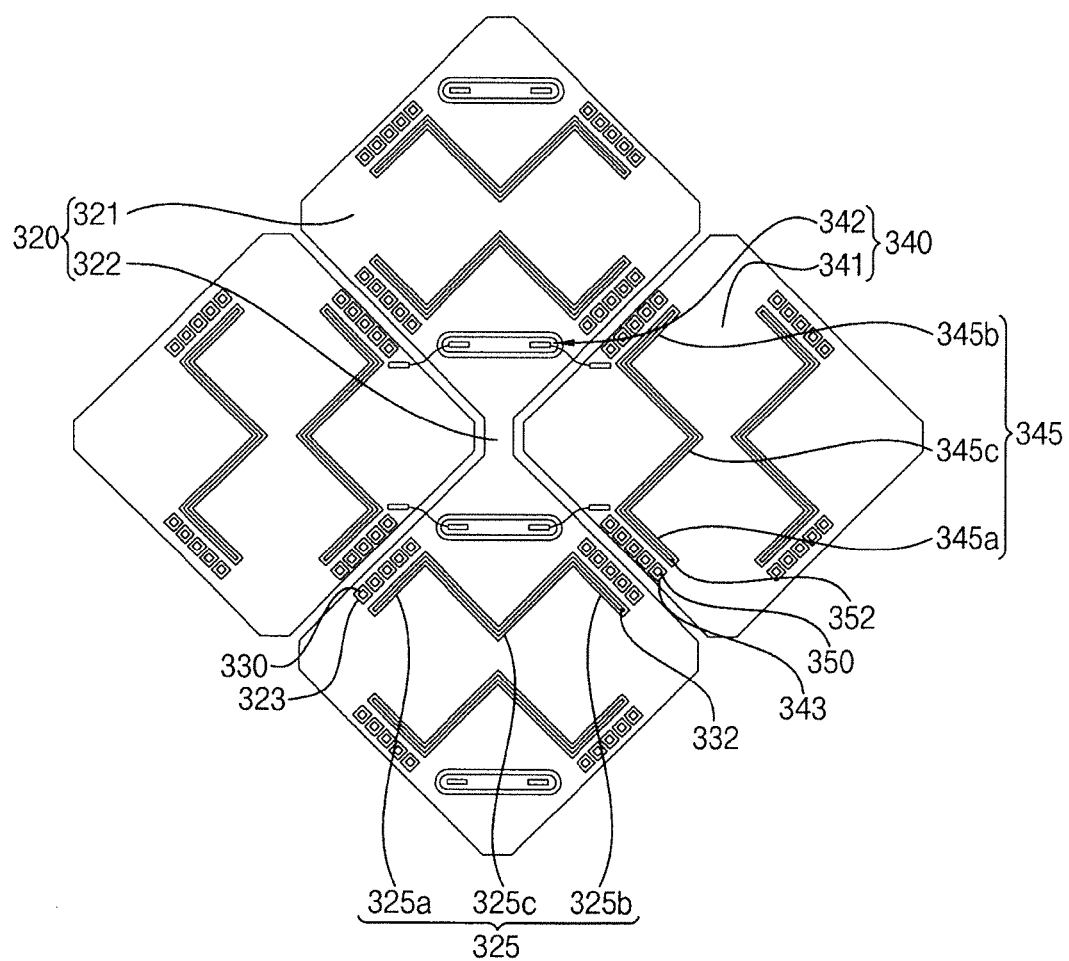
Figure 6A:
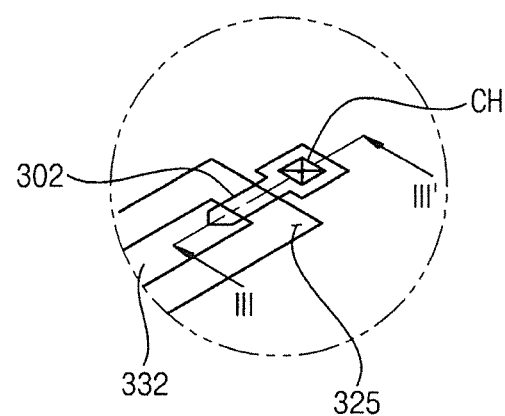
FIG. 6A is a partially enlarged plan view illustrating a second opening of the touch screen panel in FIG. 5.
Figure 6B:
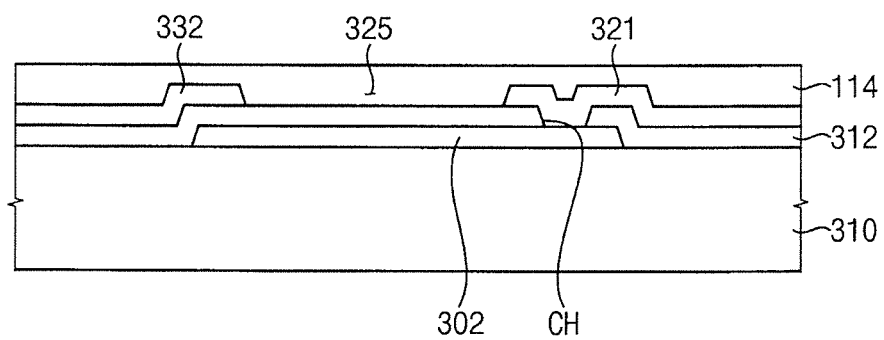
FIG. 6B is a cross-sectional view illustrating the touch screen panel taken along the line III-III' in FIG. 6A.

FIG. 5 is an enlarged plan view illustrating a portion of a touch screen panel in accordance with some example embodiments. FIG. 6A is a partially enlarged plan view illustrating a second opening of the touch screen panel in FIG. 5 and FIG. 6B is a cross-sectional view illustrating the touch screen panel taken along the line III-III' in FIG. 6A. The touch screen panel 300 illustrated in FIGS. 5, 6A and 6B may have a configuration that is substantially the same as or substantially similar to that of the touch screen panel 100 described with reference to FIGS. 1 to 3B except for conductive patterns and openings.

Referring to FIGS. 1, 5, 6A and 6B, the touch screen panel 300 may include a transparent substrate 110, first sensing lines 320, first conductive patterns 330, second conductive patterns 332, second sensing lines 340, third conductive patterns 350, fourth conductive patterns 352, first detecting lines 160, second detecting lines 170, etc.

The first sensing lines 320 may extend on the transparent substrate 110 along a first direction. Each of the first sensing lines 320 may include a plurality of first sensing cells 321 arranged along the first direction and a plurality of first connection patterns 322 for the connection or coupling of adjacent first sensing cells 321. For example, each first sensing cell 321 may have various plane shapes such as a substantially diamond shape, a substantially rhombus shape, a substantially square shape having processed corners, etc. However, the shape of each first sensing cell 321 may vary in accordance with the shape of the touch screen panel 300 without limiting to those shapes.

In example embodiments, each first sensing cell 321 may include a plurality of first openings 323, which may be adjacent a first connection pattern 322, and a plurality of second openings 325, which may be adjacent the first openings 323. For example, each of the second openings 325 may have a bending slot (or slit) shape. Additionally, each first sensing cell 321 may include first conductive patterns 330 located in the first openings 323, respectively. Furthermore, each first sensing cell 321 may include second conductive patterns 332 located in the second openings 325, respectively.

As illustrated in FIG. 5, the first openings 323 may be arranged substantially parallel to sides of the first sensing cell 321 adjacent the first connection pattern 322. For example, the first openings 323 may be separated from the sides of the first sensing cell 321 (e.g., separated by predetermined distances). In addition, four sets of the first openings 323 may be arranged adjacent to four sides of the first sensing cell 321. In this case, the sets of the first openings 323 may include the same number of the first openings 323. For example, each of the first openings 323 may have various plane shapes such as a substantially diamond shape, a substantially rhombus shape, a substantially square shape, etc. The first conductive patterns 330 may have shapes substantially the same as or substantially similar to those of the first openings 323. Each of the first conductive patterns 330 may be spaced apart from an inner sidewall of each of the first openings 323.

In example embodiments, the second openings 325 may be symmetrically arranged centering (e.g., centered around or with respect to) a central portion of the first sensing cell 321. For example, two second openings 325 may be symmetrically arranged near the central portion of the first sensing cell 321. In addition, each of the second openings 325 may have a zigzag configuration or pattern. Each of the second openings 325 may be separated from each of the first openings 323 (e.g., separated by a predetermined gap). Each of the second openings 325 may include a first extension portion 325a, a second extension portion 325b and a first central portion 325c. Here, both ends of the first central portion 325c of the second opening 325 may be connected to the first extension portion 325a and the second extension portion 325b, respectively. Namely, the first and the second extension portions 325a and 325b may be communicated with the first central portion 325c. Each of the first and the second extension portions 325a and 325b may bend along a direction substantially parallel to each of the sides of the first sensing cell 321. For example, each of the first and the second extension portions 325a and 325b may bend from the respective ends of the first central portion 325c by a substantially right angle. The first extension portion 325a may be located substantially parallel to one set of the first openings 323 and the second extension portion 325b may be positioned substantially parallel to another set of the first openings 323. That is, the first and the second extension portions 325a and 325b may be located substantially parallel to the two sides of the first sensing cell 321. The first central portion 325c may bend toward a center of the first sensing cell 321. For example, a center of the first central portion 325c may bend by a substantially right angle. In this case, one set of the first openings 323 may be located between the first extension portion 325a and one side of the first sensing cell 321, and another set of the first openings 323 may be located between the second extension portion 325b and another side of the first sensing cell 321.

In example embodiments, each second conductive pattern 332 may have a shape that is substantially the same as or substantially similar to that of each second opening 325. For example, each of the second conductive patterns 332 may have a relatively long length and also may have a substantially zigzag shape (or pattern) in each of the second openings 325. That is, a central portion of the second conductive pattern 332 may bend toward the center of the first sensing cell 321, and lateral portions of the second conductive pattern 332 may bend in directions substantially parallel to the sides of the first sensing cell 321. Here, the second conductive patterns 332 may be spaced apart from inner sidewalls of the second openings 325, respectively. Additionally, each of the second conductive patterns 332 may include a material that is substantially the same as or substantially similar to that in each first sensing cell 321. For example, each of the second conductive patterns 332 may include a transparent conductive material. The second conductive patterns 332 and the first sensing cells 321 may be located at the substantially same level. Namely, upper faces of the second conductive patterns 322 and the first sensing cells 321 may be placed on the same plane.

According to example embodiments, the first and the second conductive patterns 330 and 332 may block or greatly reduce external static electricity flowing into the touch screen panel 300 through the first sensing lines 320. In this case, the second conductive patterns 332 may basically reduce the static electricity, and then the first conductive patterns 330 may additionally reduce the static electricity. Alternatively, the first conductive patterns 330 may primarily decrease the static electricity, and then the second conductive patterns 332 may secondarily decrease the static electricity. Therefore, the external static electricity may be more effectively removed or decreased because the energy of the external static electricity may be twice reduced by the first and the second conductive patterns 330 and 332.

Referring now to FIG. 5, the second sensing lines 340 may extend on the transparent conductive substrate 110 along a second direction that is substantially perpendicular to the first direction. Each of the second sensing lines 340 may include a plurality of second sensing cells 341 arranged in the second direction, and a plurality of second connection patterns 342 for connecting or coupling the second sensing cells 341 to one another. Each of the second sensing cells 341 may have various plane shapes, for example, a substantially diamond shape, a substantially rhombus shape, a substantially square shape, etc.

As illustrated in FIG. 5, each second sensing cell 341 may include a plurality of third openings 343, which may be adjacent the second connection patterns 342, and a plurality of fourth openings 345 having slot (or slit) shapes. Further, each second sensing cell 341 may include third conductive patterns 350 and fourth conductive patterns 352 located in the third openings 343 and the fourth openings 345, respectively. Each of the third and the fourth conductive patterns 350 and 352 may be separated from each of inner sidewalls of the third and the fourth openings 343 and 345 (e.g., separated by a predetermined distance).

In example embodiments, the third openings 343 may be arranged in a direction substantially parallel to two sides of the second sensing cell 341 adjacent the second connection patterns 342. For example, two sets of the third openings 343 may be arranged along a first side and a second side of the second sensing cell 341 near the second connection patterns 342. Here, the numbers of one set of the third openings 343 may be substantially the same as the number of another set of the third openings 343. Further, two sets of the third openings 343 may be arranged in a direction that is substantially parallel to a third side and a fourth side of the second cell 341. Each of the third openings 343 may have a plane shape such as a substantially diamond shape, a substantially rhombus shape, a substantially square shape, etc. Each of the third conductive patterns 350 may have a shape that is substantially the same as or substantially similar to that of each third opening 343. Each third conductive pattern 350 may be spaced apart from an inner sidewall (e.g., inner sidewalls) of the each third opening 343. Thus, four sets of the third conductive patterns 350 may be arranged along the four sides of the second sensing cell 341.

The fourth openings 345 may be arranged centering (e.g., centered around or with respect to) a central portion of the second sensing cell 341. The fourth openings 345 may also have zigzag structures (or patterns), respectively. Each of the fourth openings 345 may be separated from each of the third openings 343 (e.g., separated by a predetermined gap). For example, the third openings 343 may be positioned between end portions of the fourth openings 345 and the sides of the second sensing cell 341, respectively. In example embodiments, one second sensing cell 341 may include two fourth openings 345, and each of the fourth openings 345 may have a third extension portion 345a, a fourth extension portion 345b and a second central portion 345c. Here, the two fourth openings 345 may be substantially symmetrically arranged centering (e.g., with respect to or centered around) the center of the second sensing cell 341. The first and the second extension portions 345a and 345b may bend from respective ends of the second central portion 345c. That is, the third and the fourth extension portions 345a and 345b may be communicated with the second central portion 345c. Additionally, the second central portion 345c may also bend at the center of the second sensing cell 341. The third and the fourth extension portions 345a and 345b may be arranged along a direction substantially parallel to the two sides of the second sensing cell 341 adjacent the second connection pattern 342. For example, each of the third and the fourth extension portions 345a and 345b may bend from the ends of the second central portion 345c by a substantially right angle. The third extension portion 345a may be located substantially parallel to one set of the third openings 343 and the second extension portion 345b may be located substantially parallel to another set of the third openings 343. That is, the third and the fourth extension portions 345a and 345b may be located substantially parallel to the two sides of the second sensing cell 341. The second central portion 345c may bend toward the center of the second sensing cell 341. For example, a center of the second central portion 345c may bend by a substantially right angle. Here, one set of the third openings 343 may be located between the third extension portion 345a and one side of the second sensing cell 341, and another set of the third openings 343 may be located between the fourth extension portion 345b and another side of the second sensing cell 341.

In example embodiments, each of the fourth conductive patterns 352 may have a shape that is substantially the same as or substantially similar to that of each of the fourth openings 345. For example, each fourth conductive pattern 352 may have a relatively long length and also may have a substantially zigzag shape (or pattern) located in each the fourth openings 345. Thus, a central portion of the fourth conductive pattern 352 may bend toward the center of the second sensing cell 341, and lateral portions of the fourth conductive pattern 352 may bend in directions that are substantially parallel to the sides of the second sensing cell 341. In this case, the fourth conductive patterns 342 may be spaced apart from inner sidewalls of the fourth openings 345, respectively. Further, each of the fourth conductive patterns 352 may include a material that is substantially the same as or substantially similar to that in the second sensing cell 341. For example, each of the fourth conductive patterns 352 may include a transparent conductive material. The fourth conductive patterns 352 and the second sensing cell 341 may be located on substantially the same plane.

In the touch screen panel 300 according to example embodiments, the third and the fourth conductive patterns 350 and 352 may effectively remove or reduce static electricity flowing to the second sensing lines 340 from an outside. For example, the fourth conductive patterns 352 may primarily remove or reduce the amount of the static electricity, and then the third conductive patterns 350 may secondarily remove or reduce the amount of the static electricity. Therefore, the static electricity flowed from the outside may be more efficiently removed or reduced by the third and the fourth conductive patterns 350 and 352.

As illustrated in FIGS. 5 and 6A, the touch screen panel 300 may additionally include a lightning conductor 302. The lightning conductor 302 may extend to the second conductive patterns 332. The lightning conductor 302 may enable a corresponding one of the second conductive patterns 332 to more effectively store the static electricity. For example, the lightning conductor 302 may introduce the static electricity into the second conductive patterns 332.

The lightning conductor 302 may be positioned at a level that is substantially different form the level at which the first sensing cell 321 and the second conductive patterns 332 are positioned. That is, the insulation layer 312 may be positioned between the lightning conductor 302, and the first sensing cell 321 and the second conductive pattern 332. One portion of the lightning conductor 302 may be substantially overlapped with the first sensing cell 321 and the other portion of the lightning conductor 302 may be substantially overlapped with the second conductive pattern 332. The lightning conductor 302 may be electrically connected to the first sensing cell 321 through the contact hole (CH) of the insulation layer 312. The other portion of the lightning conductor 302 contacting the second conductive pattern 332 may have a substantially sharp end (e.g., a tapering end). Hence, the static electricity along the first sensing cell 321 may be induced (or guided) into the second conductive pattern 332 through the lightning conductor 302, such that the static electricity may be removed by the second conductive pattern 332. For example, the lightning conductor 302 may include metal or a metal compound.

In example embodiments, a plurality of lightning conductors 302 may be provided adjacent to one second conductive pattern 332. For example, more than one of the lightning conductors 302 may be positioned at the first and the second extension portions 325a and 325b of the second opening 325, respectively.

In the touch screen panel 300 according to example embodiments, the first to the fourth conductive patterns 330, 332, 350 and 352 may remove or reduce (e.g., considerably reduce) the static electricity introduced from the outside. Therefore, the patterns in the touch screen panel 300 may not have damages caused by the static electricity to thereby prevent sensing failures of the touch screen panel 300.

Figure 7:
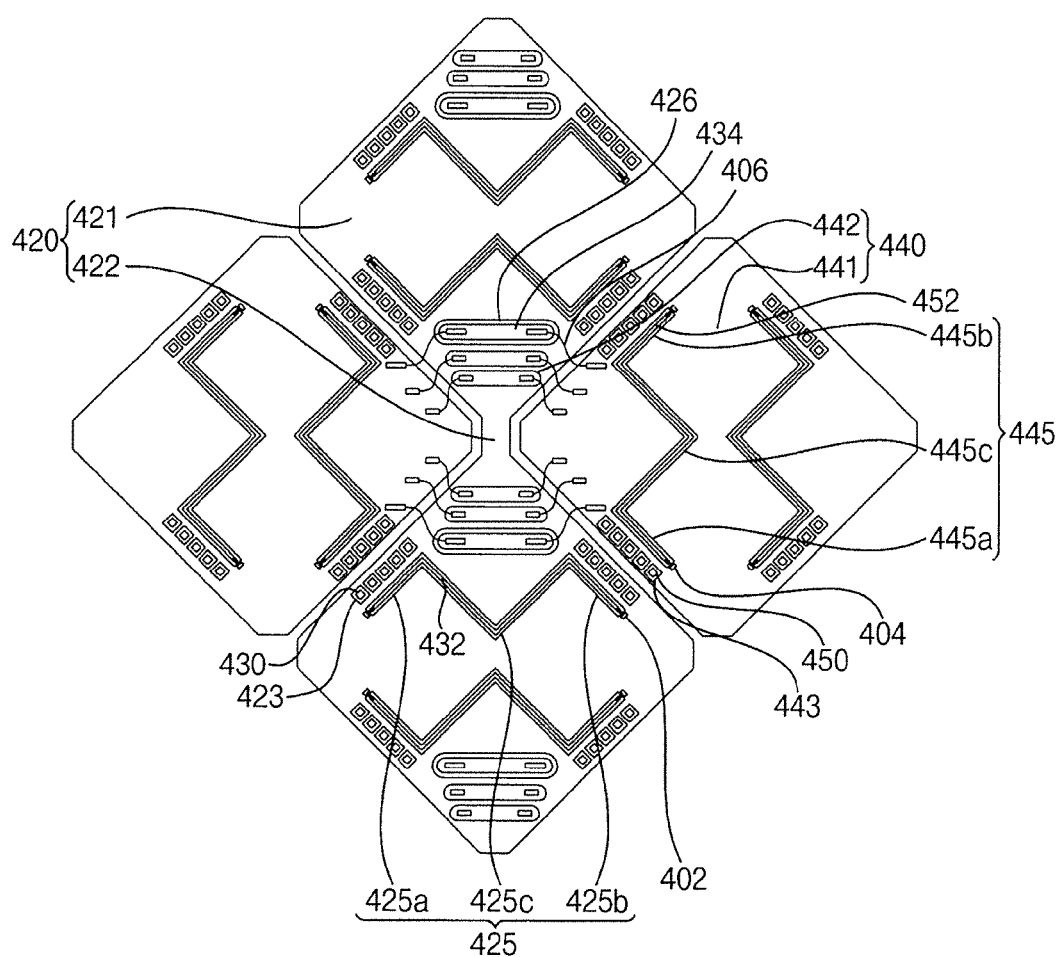

FIG. 7 is an enlarged plan view illustrating a portion of a touch screen panel in accordance with some example embodiments. The touch screen panel 400 illustrated in FIG. 7 may have a configuration that is substantially the same as or substantially similar to that of the touch screen panel 100 described with reference to FIGS. 1 to 3B.

Referring to FIGS. 1 and 7, the touch screen panel 400 may include a transparent substrate 110, first sensing lines 420, first conductive patterns 430, second conductive patterns 432, third conductive patterns 434, second sensing lines 440, fourth conductive patterns 450, fifth conductive patterns 452, first detecting lines 160, second detecting lines 170, etc.

The first sensing lines 420 may extend on the transparent substrate 110 along a first direction. Each of the first sensing lines 420 may include a plurality of first sensing cells 421 and a plurality of first connection patterns 422 for connection or coupling between adjacent first sensing cells 421. For example, each of the first sensing cells 421 may have a substantially rhombus shape, a substantially square shape, a substantially diamond shape, etc.

In example embodiments, each first sensing cell 421 may include first openings 423, second openings 425 and third openings 426, which may be adjacent the first connection patterns 422. For example, each of the second and the third openings 425 and 426 may have a substantially slot (or slit) shape. Here, each second opening 425 may have a bent slot (or slit) shape and each third opening 426 may have a substantially linear slot (or slit) shape.

The first conductive patterns 430 may be located in the first openings 423, and the second conductive patterns 432 may be located in the second openings 425. Additionally, the third conductive patterns 434 may be located in the third openings 426, respectively.

The first openings 423 may be arranged substantially parallel to two sides of the first sensing cell 421 adjacent the first connection patterns 422. For example, two sets of the first openings 423 may be spaced apart from a first side and a second side of the first sensing cell 421 adjacent the first connection patterns 422 (e.g., spaced by predetermined distances). In this case, the numbers of the first openings 423 included in the sets of the first openings 423 may be equal. Further, two sets of the first openings 423 may be arranged substantially parallel to a third side and a fourth side of the first sensing cell 421. Each of the first openings 423 may have various plan shapes such as a substantially diamond shape, a substantially rhombus shape, a substantially square shape, etc.

The first conductive patterns 430 may have shapes that are substantially the same as or substantially similar to those of the first openings 423, respectively. For example, each first conductive pattern 430 may have various plan shapes such as a substantially diamond shape, a substantially rhombus shape, a substantially square shape, etc. Here, each of the first conductive patterns 430 may have an island structure located in each first opening 423.

The second openings 425 may be more closely located to the center of the first sensing cell 421 than the first openings 423. In example embodiments, each of the second openings 425 may have a first extension portion 425*a*, a second extension portion 425*b* and a first central portion 425*c* connecting or coupling the first extension portion 425*a* to the second extension portion 425*b*. The first and the second extension portions 425*a* and 425*b* are arranged substantially parallel to two sides of the first sensing cell 421 adjacent the first connection patterns 422. The first central portion 425*c* may include a first sub-central portion connected or coupled to the first extension portion 425*a* and parallel to the second extension portion 425*b*. The first central portion 425*c* may further include a second sub-central portion connected or coupled to the second extension portion 425*b* and parallel to the first extension portion 425*a*. For example, the second openings 425 may each have a zigzag structure (or pattern). The first openings 423 may be located between the first extension portion 425*a* and one side of the first sensing cell 421 and between the second extension portion 425*b* and another side of the first sensing cell 421.

The second conductive patterns 432 may have shapes that are substantially the same as or substantially similar to those of the second openings 425. In example embodiments, each of the second conductive patterns 432 may have relatively large lengths, and may have a zigzag shape (or pattern) in which portions being substantially parallel to the sides of the first sensing cell 421 are alternatively arranged. Additionally, each second conductive pattern 432 may include a material, for example, a transparent conductive material, that is substantially the same as that of the first sensing cell 421. The second conductive patterns 432 may be located at a level that is the same as a level at which the first sensing cell 421 is positioned.

According to example embodiments, the third openings 426 may be farther from the center of the first sensing cell 421 than the first and the second openings 423 and 425. The third openings 426 may have shapes different from those of the first and the second openings 423 and 425, respectively. For example, each third opening 426 may have a substantially linear slot (or slit) shape extending in the first direction. Further, the third openings 426 may have different lengths, respectively. When the first sensing cell 421 has the substantially diamond shape and the third openings 426 are arranged in parallel to one another, the third openings 426 may have different lengths so that the each of the third openings 426 may be separated from the side of the first sensing cell 421 (e.g., separated by a constant distance). For example, the third openings 426 adjacent the center of the first sensing cell 421 may have lengths that are substantially larger than those of other third openings 426.

The third conductive patterns 434 are located in the third openings 426. Each of the third conductive patterns 434 may have a shape that is substantially the same as or substantially similar to that of each third opening 426. The third conductive patterns 434 may have characteristics that are substantially the same as those of the second conductive patterns 432 except for the shapes, so detailed description for the third conductive patterns 434 will be omitted.

As described above, the first to the third conductive patterns 430, 432 and 434 may remove or reduce (e.g., significantly reduce) the static electricity flowing through the first sensing lines 420 from an outside. Typically, damages caused by the static electricity may occur at portions where the first and the second sensing lines 420 and 440 cross each other. For example, the static electricity may cause damage to the second connection patterns 442 having relatively small widths partially overlapped with the first sensing cells 421. In this case, the first and the second conductive patterns 430 and 432 may prevent the damages to the first and the second sensing lines 420 and 440, and the third conductive patterns 434 may effectively prevent damages to the second connection patterns 442 that are relatively vulnerable to the static electricity.

Referring now to FIGS. 1 and 7, the second sensing lines 440 may extend on the transparent substrate 110 along a second direction that is substantially perpendicular to the first direction. Each of the second sensing lines 440 may include a plurality of second sensing cells 441 and a plurality of second connection patterns 442 for connecting or coupling adjacent second sensing cells 441. Each second sensing cell 441 may have various plane shapes like a substantially diamond shape, a substantially rhombus shape, a substantially square shape, etc.

In example embodiments, each of the second sensing cells 441 may include fourth openings 443 and fifth openings 445, which may be adjacent the second connection patterns 442. Fourth conductive patterns 450 may be located in the fourth openings 443, and also fifth conductive patterns 452 may be respectively located in the fifth openings 445.

The fourth openings 443 may be arranged substantially parallel to two sides of the second sensing cell 441 adjacent the second connection pattern 442. For example, some of the fourth openings 443 may be separated from a first side and a second side of the second sensing cell 441 that are adjacent the second connection patterns 442 (e.g., separated by predetermined distances). Additionally, others of the fourth openings 443 may be arranged substantially parallel to a third side and a fourth side of the second sensing cell 441. Each of the fourth openings 443 may have a plane shape such as a substantially diamond shape, a substantially rhombus shape, a substantially square shape, etc. Furthermore, the fourth conductive patterns 450 may have shapes that are substantially the same as or substantially similar to those of the fourth openings 443.

The fifth openings 445 may be located more closely to the center of the second sensing cell 441 than the fourth openings 443. In example embodiments, each fifth opening 445 may have a third extension portion 445a, a fourth extension portion 445b and a second central portion 445c for connection or coupling between the third and the fourth extension portions 445a and 445b. The third and the fourth extension portions 445a and 445b are arranged substantially parallel to two sides of the second sensing cell 441 adjacent the second connection patterns 442, respectively. The second central portion 445c may include a third sub-central portion and a fourth sub-central portion. The third sub-central portion may be connected or coupled to the third extension portion 445a and substantially parallel to the fourth extension portion 445b, and the fourth sub-central portion may be connected or coupled to the fourth extension portion 445b and substantially parallel to the third extension portion 445a. For example, the fifth openings 445 may each be arranged in (or have) a zigzag structure (or pattern). Here, the fourth openings 443 may be positioned between the third extension portion 445a and one side of the second sensing cell 441 and between the fourth extension portion 445b and another side of the second sensing cell 441.

Each of the fifth conductive patterns 452 may have a shape that is substantially the same as or substantially similar to that of each fifth opening 445. Each of the fifth conductive patterns 452 may have a relatively large length, and may have a zigzag structure (or pattern) in which portions in parallel to the two sides of the second sensing cell 441 are alternatively arranged. Each fifth conductive pattern 452 may include a material, for example, a transparent conductive material that is substantially the same as that of the second sensing cell 441. Further, the fifth conductive patterns 452 may be located on or at a plane on which the second sensing cell 441 is positioned.

In example embodiments, the fourth and the fifth conductive patterns 450 and 452 may remove or reduce (e.g., greatly reduce) static electricity flowing to the second sensing lines 440 from an outside. In this case, the fifth conductive patterns 452 may primarily reduce the static electricity, and also the fourth conductive patterns 450 may secondarily reduce the static electricity. Because the static electricity may be reduced twice in this manner, the static electricity may be efficiently reduced or removed to improve the operation characteristics of the touch screen panel 400.

In the touch screen panel 400 according to example embodiments, a first lightning conductor member (or a first lightning conductor) 402 and a second lightning conductor member (or a second lightning conductor) 404 may be additionally arranged so that the third and the fifth conductive patterns 432 and 452 may effectively accumulate the static electricity. The first and the second lightning conductor members 402 and 404 may easily induce (or guide) the static electricity to the third and the fifth conductive patterns 432 and 452, respectively.

The first lightning conductor member 402 may be located at a level different from a level at which the first sensing cell 421 and the second conductive pattern 432 are located. Alternatively, an insulation layer (not illustrated) may be interposed between the first lightning conductor member 402, and the first sensing cell 421 and the second conductive pattern 432. One end of the first lightning conductor member 402 may be substantially overlapped with the first sensing cell 421, and the other end of the first lightning conductor member 402 may be substantially overlapped with the second conductive pattern 432. The first lightning conductor member 402 may be electrically connected (or electrically coupled) to the first sensing cell 421 through a contact hole (not illustrated) formed through the insulation layer. The other end of the first lightning conductor member 402 may have a tapered shape to be overlapped with the second conductive pattern 432. Therefore, the static electricity may be effectively induced (or guided) and accumulated to the second conductive pattern 432 through the first lightning conductor member 402.

The first lightning conductor member 402 may include a conductive metal compound or metal. In example embodiments, a plurality of first lightning conductor members 402 may be provided to the second conductive patterns 432. For example, the first lightning conductor members 402 may be located at respective ends of the second openings 425 adjacent the center of the first sensing cell 421.

The second lightning conductor member 404 may be located on a plane that is different from a plane on which the second sensing cell 441 and the fourth conductive patterns 450 are located. The second lightning conductor member 404 may have features that are substantially the same as those of the first lightning conductor member 402 except for the arrangement thereof. Thus, detailed description of the second lightning conductor member 404 will be omitted. In example embodiments, a plurality of second lightning conductor members 404 may be provided for one of the fourth conductive patterns 450. For example, the second lightning conductor members 404 may be located at respective ends of the fifth opening 445.

In some example embodiments, the touch screen panel 400 may additionally include dummy wiring patterns 406 for enhancing the removal effect of the static electricity by the third conductive patterns 434. The static electricity may take a long way due to the dummy wiring patterns 406, so that the static electricity may be more effectively removed or reduced. When a relatively large amount of static electricity flows into the touch screen panel 400, the dummy wiring patterns 406 may be damaged first before the second connection patterns 442 are damaged by the static electricity. Because the amount of the static electricity may decrease by the dummy wiring patterns 406, the damages to the second connection patterns 442 may be efficiently prevented.

According to example embodiments, the dummy wiring patterns 406 may be located at respective ends of the third conductive patterns 434, respectively. Each of the dummy wiring patterns 406 may connect adjacent second sensing cell 441 to one end (or the other end) of the third conductive pattern 434 located in the third opening 426. The dummy wiring patterns 406 may be positioned at a level different from a level at which the second sensing cell 441 and the third conductive patterns 434 are located. For example, an insulation layer (not illustrated) may be located between the dummy wiring patterns 406, and the second sensing cells 441 and the third conductive patterns 434. One end of each dummy wiring pattern 406 may be substantially overlapped with the second sensing cell 441, and the other end of each dummy wiring pattern 406 may be substantially overlapped with the third conductive pattern 434. Although it is not illustrated, the dummy wiring patterns 406 may be connected to the second sensing cells 441 and the third conductive patterns 434 through contact holes provided through the insulation layer.

Referring to FIG. 7, the dummy wiring patterns 406 may be arranged about adjacent third conductive patterns 434 along different directions, respectively. For example, one dummy wiring pattern 406 may be provided at end of one third conductive pattern 434. Here, another dummy wiring pattern 406 may be provided at the other end of another third conductive pattern 434. In this manner, the dummy wiring patterns 406 may be located at alternating ends of the third conductive patterns 434, so that the dummy wiring patterns 406 may be damaged first by the static electricity, thereby reducing (e.g., considerably reducing) the amount of the static electricity.

As described above, the touch screen panel 400 may include the first to the fifth conductive patterns 430, 432, 434, 450 and 452, such that the static electricity flowing into the first and the second sensing lines 420 and 440 from the outside may be more efficiently removed or reduced. As a result, the damages to components of the touch screen panel 400 may be effectively prevented although the static electricity flows into the touch screen panel 400.

Figure 8:
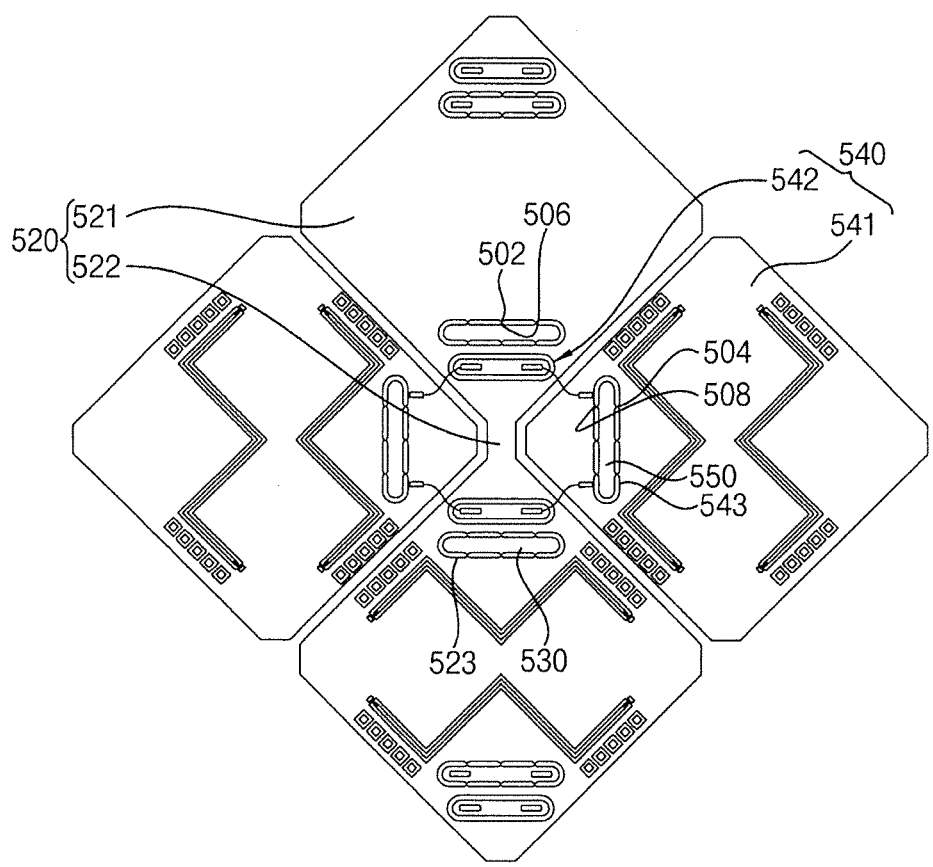
Figure 9:
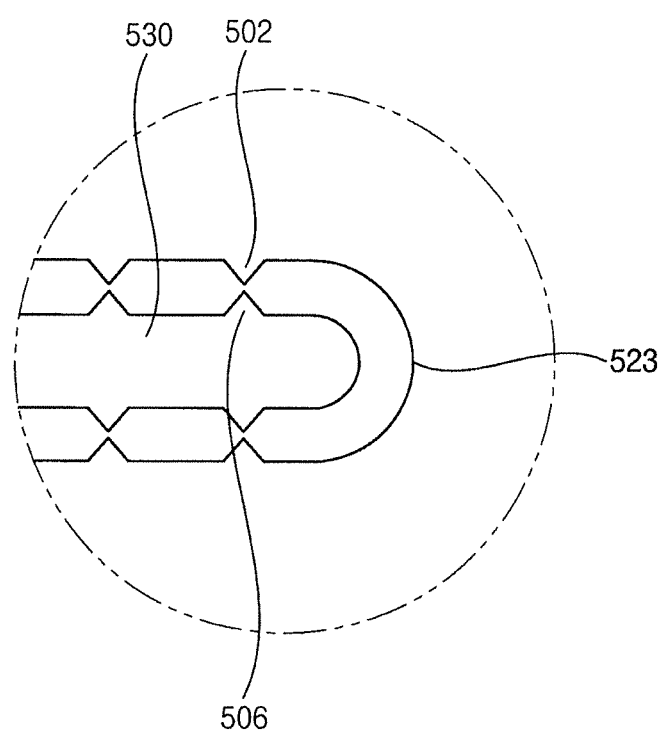

FIG. 8 is an enlarged plan view illustrating a portion of a touch screen panel in accordance with some example embodiments. FIG. 9 is a partially enlarged plan view illustrating a first opening of the touch screen panel in FIG. 8. The touch screen panel 500 illustrated in FIGS. 8 and 9 may have a configuration that is substantially the same as or substantially similar to that of the touch screen panel described with reference to FIG. 5 or FIG. 7. Thus, reference numbers and descriptions of the same components of the touch screen panels will be omitted for the sake of illustration and description of the touch screen panel 500.

Referring to FIGS. 1, 8 and 9, the touch screen panel 500 may include a transparent substrate 110, first sensing lines 520, first additional conductive patterns 530, second sensing lines 540, second additional conductive patterns 550, first detecting lines 160, second detecting lines 170, etc.

The first sensing lines 520 may extend on the substrate 110 in the first direction. Each of the first sensing lines 520 may include a plurality of first sensing cells 521 arranged in the first direction and a plurality of first connection patterns 522 for connection or coupling of the first sensing cells 521.

Each of the first sensing cells 521 may include first additional openings 523, which may be adjacent the first connection patterns 522. The first additional conductive patterns 530 may be located in the first additional openings 523, respectively. For example, each first additional opening 523 may have a slot (or slit) shape extending along the second direction that is substantially perpendicular to the first direction. The first additional conductive patterns 530 may be positioned as island shapes in the first additional openings 523, and also may have shapes that are substantially the same as those of the first additional openings 523. Hence, the first additional conductive patterns 530 may be arranged in the second direction. The first additional conductive patterns 530 may effectively reduce or remove the static electricity flowed into the first sensing lines 520 from the outside.

The second sensing lines 540 may extend on the substrate 110 in the second direction. Each of the second sensing lines 540 may include a plurality of second sensing cells 541 arranged in the second direction and a plurality of second connection patterns 542 for connection or coupling of the second sensing cells 541.

Each of the second sensing cells 541 may include second additional openings 543, which may be adjacent the second connection patterns 542. The second additional conductive patterns 550 may be located in the second additional openings 543, respectively. For example, each of the second additional openings 543 may have a slot (or slit) shape extending along the first direction. The second additional conductive patterns 550 may be located as island shapes in the second additional openings 543, and may have shapes that are substantially the same as those of the second additional openings 543. The second additional conductive patterns 550 may be arranged to extend in the first direction. The second additional conductive patterns 550 may also effectively reduce or remove the static electricity flowed into the second sensing lines 540 from the outside.

In some example embodiments, in order to induce (or guide) the static electricity into the first and the second additional conductive patterns 530 and 550, at least one lightning conductor member (or at least one lightning conductor) may be provided between the first sensing cell 521 and the first additional conductive pattern 530 and between the second sensing cell 541 and the second additional conductive pattern 550, in a manner similar to those described above in reference to previously described embodiments.

In example embodiments, each first sensing cell 521 may include first protruding portions 502. The first protruding portions 502 may protrude from inner sidewalls of the first additional openings 523 toward centers of the first additional openings 523, respectively. For example, a plurality of first protruding portions 502 may be arranged on (and along) the inner sidewall of the first openings 523 and spaced from each other (e.g., spaced from each other by predetermined distances). Here, each of the first protruding portions 502 may include substantially tapered ends so as to easily induce (or guide) the static electricity. Each of the second sensing cells 541 may include second protruding portions 504, which protrude from inner sidewalls of the second additional openings 543 toward centers of the second additional openings 543, respectively. For example, a plurality of second protruding portions 504 may be located along the inner sidewall of the second additional openings 543 and spaced from each other (e.g., spaced from each other by predetermined distances). Similarly, each of the second protruding portions 504 may include substantially tapered ends in order to easily induce (or guide) the static electricity.

The first and the second sensing cells 521 and 541 may respectively include third and fourth protruding portions 506 and 508, which may be located on the first and second additional conductive patterns 530 and 550. The third and the fourth protruding portions 506 and 508 may substantially correspond to the first and the second protruding portions 502 and 504, respectively. In example embodiments, each first additional conductive pattern 530 may include the third protruding portions 506 substantially corresponding to the first protruding portions 502. The third protruding portions 506 may extend toward the first protruding portions 502. Each of the second additional conductive patterns 550 may also include the fourth protruding portions 508 substantially corresponding to the second protruding portions 504. In this case, the fourth protruding portions 508 may also extend toward the second protruding portions 504. For example, end portions of the first protruding portions 502 may be spaced apart from the end portions of the third protruding portions 506 (e.g., spaced by predetermined distances). Additionally, end portions of the second protruding portions 504 may be separated from end portions of the fourth protruding portions 508 (e.g., separated by predetermined distances). Here, the third and the fourth protruding portions 506 and 508 may also have substantially tapered ends so as to easily induce (or guide) the static electricity. The first and the second protruding portions 502 and 504 may not contact the third and the fourth protruding portions 506 and 508, respectively. That is, the ends of the first and the second protruding portions 502 and 504 may be spaced apart from the ends of the third and the fourth protruding portions 506 and 508 (e.g., spaced by predetermined gaps).

As for the touch screen panel according to example embodiments, the first and the second sensing cells may include one or more openings provided adjacent to crossing regions between the first sensing lines and the second sensing lines, particularly the first and the second connection patterns. Additionally, conductive patterns may be respectively located in the openings. The static electricity flowed in the touch screen panel from the outside may be accumulated on the conductive patterns, so that the static electricity may be reduced (e.g., significantly reduced) or removed. As a result, the damages to the components or the patterns of the touch screen panel may be effectively prevented to thereby improve (e.g., reduce or eliminate) the failures of touch operation of the touch screen panel.

The foregoing is illustrative of example embodiments and is not to be construed as limiting thereof. Although a few example embodiments have been described, those skilled in the art will readily appreciate that many modifications are possible in the example embodiments without materially departing from the novel teachings and aspects of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

What is claimed is:

1. A touch screen panel comprising:
    a transparent substrate;
    a first sensing line comprising a plurality of first sensing cells arranged on the transparent substrate along a first direction, and a plurality of first connection patterns coupling adjacent ones of the first sensing cells; and
    a second sensing line comprising a plurality of second sensing cells arranged on the transparent substrate along a second direction perpendicular to the first direction, and a plurality of second connection patterns connecting adjacent ones of the second sensing cells, the second sensing line being electrically insulated from the first sensing line,
    wherein each of the first sensing cells has a plurality of first openings and a dummy opening, wherein a plurality of first conductive patterns is in the first openings and a bridge pattern is in and surrounded by the dummy opening, the bridge pattern being electrically coupled to the second sensing cells, and wherein each of the second sensing cells has a plurality of second openings, and a plurality of second conductive patterns is in the second openings.

2. The touch screen panel of claim 1, wherein the first openings are arranged along the second direction and the second opening are arranged along the first direction.

3. The touch screen panel of claim 2, wherein the first openings and the second openings are arranged in zigzag patterns, respectively.

4. The touch screen panel of claim 2, wherein each of the first and the second openings has a circle shape, an ellipse shape, a diamond shape, a rhombus shape or a polygon shape.

5. The touch screen panel of claim 1, wherein the first conductive patterns in the first openings have island shapes and the second conductive patterns in the second openings have island shapes.

6. The touch screen panel of claim 1, wherein each of the first sensing cells and the second sensing cells comprises a transparent conductive material.

7. The touch screen panel of claim 6, wherein the first conductive patterns and the second conductive patterns comprise materials that are same as materials of the first sensing cells and the second sensing cells, respectively.

8. The touch screen panel of claim 1, wherein each of the first sensing cells and the second sensing cells has a diamond shape, a rhombus shape or a square shape having rounded or cut corners.

9. The touch screen panel of claim 8, wherein the first connection patterns are integrally formed with the first sensing cells, and
    wherein the second connection patterns are separated from the first connection patterns and partially overlapped with the first connection patterns, respectively.

10. The touch screen panel of claim 9, wherein a pair of the second connection patterns is between adjacent ones of the second sensing cells and one of the first connection patterns is between the pair of the second connection patterns.

11. The touch screen panel of claim 8, wherein each of the first sensing cells further comprises a third opening including a first extension portion and a second extension portion parallel to two sides of each first sensing cell adjacent to the first connection pattern, and further comprises a first central portion coupling the first extension portion to the second extension portion, and
    wherein each of the second sensing cells further comprises a fourth opening comprising a third extension portion and a fourth extension portion parallel to two sides of each second sensing cell adjacent to the second connection pattern, and further comprises a second central portion coupling the third extension portion to the fourth extension portion.

12. The touch screen panel of claim 11, wherein the first central portion comprises a first sub-central portion parallel to the first extension portion and a second sub-central portion parallel to the second extension portion, and
    wherein the second central portion comprises a third sub-central portion parallel to the third extension portion and a fourth sub-central portion parallel to the fourth extension portion.

13. The touch screen panel of claim 11, wherein the first openings are between one side of the first sensing cell adjacent to the first connection pattern and the first extension portion and between another side of the first sensing cell adjacent to the first connection pattern and the second extension portion, and wherein the second openings are between one side of the second sensing cell adjacent to the second connection pattern and the third extension portion and between another side of the second sensing cell adjacent to the second connection pattern and the fourth extension portion.

14. The touch screen panel of claim 13, wherein the first openings located between one side of the first sensing cell adjacent to the first connection pattern and the first extension portion is parallel to one side of the first sensing cell, and the first openings located between another side of the first sensing cell adjacent to the first connection pattern and the second extension portion is parallel to another side of the first sensing cell, and wherein the second openings located between one side of the second sensing cell adjacent to the second connection pattern and the third extension portion is parallel to one side of the second sensing cell, and the second openings located between another side of the second sensing cell adjacent to the second connection pattern and the fourth extension portion is parallel to another side of the second sensing cell.

15. The touch screen panel of claim 11, wherein each of the first sensing cells further comprises a third conductive pattern in the third opening, and each of the second sensing cells further comprises a fourth conductive pattern in the fourth opening.

16. The touch screen panel of claim 15, wherein the third conductive pattern in the third opening has an island shape, and the fourth conductive pattern in the fourth opening has an island shape.

17. The touch screen panel of claim 15, further comprising at least one first lightning conductor positioned at a level different from that of the first sensing cell and the third conductive pattern, the at least one first lightning conductor comprising one end electrically connected to the first sensing cell and another end partially overlapped with the third conductive pattern; and at least one second lightning conductor positioned at a level different from that of the second sensing cell and the fourth conductive pattern, the at least one second lightning conductor comprising one end electrically connected to the second sensing cell and another end partially overlapped with the fourth conductive pattern.

18. The touch screen panel of claim 17, wherein each of the first and the second lightning conductors comprises metal or a conductive metal compound.

19. The touch screen panel of claim 17, wherein the first lightning conductor is at one end of the third conductive pattern, and the second lightning conductor is at one end of the fourth conductive pattern.

20. The touch screen panel of claim 15, wherein each of the first sensing cells further comprises:

a plurality of fifth openings having slot shapes extending in the second direction and being arranged in parallel to one another; and a plurality of fifth conductive patterns in the fifth openings, respectively.

21. The touch screen panel of claim 20, wherein the fifth openings are located between the first connection patterns and the third opening.

22. The touch screen panel of claim 20, wherein each fifth conductive pattern located in each fifth opening has an island shape.

23. The touch screen panel of claim 20, wherein each of the fifth conductive patterns comprises a transparent conductive material.

24. The touch screen panel of claim 20, wherein the fifth openings have different lengths from each other.

25. The touch screen panel of claim 20, further comprising dummy wiring patterns located at a level different from that of the fifth conductive patterns and the second sensing cells, wherein the dummy wiring patterns electrically connect the fifth conductive patterns to adjacent ones of the second sensing cells.

26. The touch screen panel of claim 25, wherein each of the dummy wiring patterns comprises metal or a conductive metal compound.

27. The touch screen panel of claim 25, wherein the dummy wiring patterns respectively extend in different directions relative to the fifth conductive patterns.

28. A touch screen panel comprising:

a transparent substrate;

a first sensing line comprising a plurality of first sensing cells arranged on the transparent substrate along a first direction, and a plurality of first connection patterns coupling adjacent ones of the first sensing cells; and a second sensing line comprising a plurality of second sensing cells arranged on the transparent substrate along a second direction perpendicular to the first direction, and a plurality of second connection patterns connecting adjacent ones of the second sensing cells, the second sensing line being electrically insulated from the first sensing line, wherein each of the first sensing cells comprises a plurality of first openings and a plurality of first conductive patterns in the first openings, and each of the second sensing cells comprises a plurality of second openings and a plurality of second conductive patterns in the second openings, wherein each of the first sensing cells comprises a dummy opening having a slot shape extending in the second direction, the dummy opening being adjacent each first connection pattern, and wherein each of the second connection patterns comprises:

a bridge pattern in the dummy opening and having an island shape; and a pair of wiring patterns electrically connecting the bridge pattern to the second sensing cells, the wiring patterns being positioned at a level different from that of the first sensing cells and the second sensing cells.

29. The touch screen panel of claim 28, wherein the dummy opening is between the first connection pattern and the first opening.

30. The touch screen panel of claim 28, wherein the bridge pattern comprises a transparent conductive material and each of the wiring patterns comprises metal or a conductive metal compound.

31. A touch screen panel comprising:

a transparent substrate;

a first sensing line comprising a plurality of first sensing cells arranged in a first direction and a plurality of first connection patterns coupling adjacent ones of the first sensing cells; and a second sensing line electrically insulated from the first sensing line, the second sensing line comprising a plurality of second sensing cells arranged in a second direction perpendicular to the first direction and a plurality of second connection patterns coupling adjacent ones of the second sensing cells, wherein at least one of the first sensing cells or the second sensing cells comprises openings, and conductive patterns are in the openings, wherein the first sensing cells have a dummy opening having therein and surrounding a bridge pattern, the bridge pattern being coupled to the second sensing cells.

32. The touch screen panel of claim 31, wherein each of the first sensing cells comprises first openings having slot shapes and being adjacent to the first connection patterns, and first conductive patterns in the first openings.

33. The touch screen panel of claim 32, wherein each of the second sensing cells comprises second openings having slot shapes and being adjacent to the second connection patterns, and second conductive patterns in the second openings.

34. The touch screen panel of claim 33, wherein each of the first conductive patterns in the first opening has an island shape, and each of the second conductive patterns in the second opening has an island shape.

35. The touch screen panel of claim 33, wherein each of the first sensing cells further comprises a plurality of first protruding portions extending from inner sidewalls of the first openings, the first protruding portions being separated from one another, and wherein each of the second sensing cells further comprises a plurality of second protruding portions extending from inner sidewalls of the second openings, the second protruding portions being separated from one another.

36. The touch screen panel of claim 35, wherein each of the first conductive patterns further comprises a plurality of third protruding portions corresponding to the first protruding portions, respectively, and wherein each of the second conductive patterns further comprises a plurality of fourth protruding portions corresponding to the second protruding portions, respectively.

* * * * *